US008813943B2

(12) United States Patent
Ramankutty et al.

(10) Patent No.: US 8,813,943 B2
(45) Date of Patent: Aug. 26, 2014

(54) POSITIVE DISPLACEMENT SORTER

(75) Inventors: Mohan A. Ramankutty, Grand Rapids, MI (US); Kenneth J. Kooistra, Byron Center, MI (US); Floyd W. Butler, Newaygo, MI (US); Dennis J. Schuitema, Ada, MI (US); Paul Kreys, Grand Rapids, MI (US); Thomas H. Triesenberg, Rockford, MI (US); Ronald C. Ehlert, Wyoming, MI (US); David D. Sayers, Kentwood, MI (US)

(73) Assignee: Dematic Corp., Grand Rapids, MI (US)

( * ) Notice: Subject to any disclaimer, the term of this patent is extended or adjusted under 35 U.S.C. 154(b) by 408 days.

(21) Appl. No.: 13/104,657

(22) Filed: May 10, 2011

(65) Prior Publication Data
US 2012/0048677 A1 Mar. 1, 2012

Related U.S. Application Data

(60) Provisional application No. 61/377,667, filed on Aug. 27, 2010.

(51) Int. Cl.
*B65G 47/46* (2006.01)

(52) U.S. Cl.
USPC .................. 198/370.02; 198/370.07; 198/833

(58) Field of Classification Search
USPC .................. 198/370.02, 370.07, 832, 833
See application file for complete search history.

(56) References Cited

U.S. PATENT DOCUMENTS

| 802,047 | A | * | 10/1905 | Krell | 198/710 |
|---|---|---|---|---|---|
| 1,279,579 | A | * | 9/1918 | Perkins | 198/833 |
| 1,414,674 | A | * | 5/1922 | Skinner | 198/637 |

(Continued)

FOREIGN PATENT DOCUMENTS

| DE | 4424110 C1 | 6/1995 |
|---|---|---|
| EP | 0792824 A1 | 9/1997 |

OTHER PUBLICATIONS

International Search Report (Form PCT/ISA/210) and Written Opinion of the International Searching Authority (Form PCT/ISA/237) from corresponding Patent Cooperation Treaty Application No. PCT/US2011/035943, mailed Aug. 18, 2011.

(Continued)

*Primary Examiner* — Leslie A Nicholson, III
*Assistant Examiner* — Keith R Campbell
(74) *Attorney, Agent, or Firm* — Gardner, Linn, Burkhart & Flory, LLP

(57) ABSTRACT

A positive displacement sorter includes a plurality of interconnected parallel slats defining an endless web that travels in a longitudinal direction. The web has upper and lower runs and transition sections between the upper and lower runs. An upper surface of the upper run of the web defining an article-conveying surface. A plurality of pusher shoes travels along at least one of the slats in order to laterally divert articles on the conveying surface. Each of the shoes has a diverting member extending below the conveying surface. A plurality of diverting rails below the conveying surface is capable of engaging the diverting member to cause the associated shoe to travel laterally to divert an article. A plurality of diverters selectively diverts at least one of the diverting members from a non-diverting path extending longitudinally along the sorter to one of the diverting rails in a diverting state. A propulsion system propels the web. The propulsion system includes at least one drive assembly engaging a lower surface of the upper run or an upper surface of the lower run.

26 Claims, 22 Drawing Sheets

(56) References Cited

U.S. PATENT DOCUMENTS

| | | | | |
|---|---|---|---|---|
| 1,539,808 | A | 5/1925 | Allsop | |
| 2,859,689 | A | 11/1958 | Ackley | |
| 2,863,555 | A * | 12/1958 | Jaritz | 198/833 |
| 2,918,020 | A * | 12/1959 | Henderson et al. | 104/172.5 |
| 3,033,353 | A * | 5/1962 | Burnett et al. | 198/833 |
| 3,268,065 | A | 8/1966 | Thomson | |
| 3,343,653 | A | 9/1967 | Thomson | |
| 3,410,390 | A | 11/1968 | Petersen | |
| 3,858,473 | A * | 1/1975 | Bystron | 83/401 |
| 3,869,574 | A | 3/1975 | Kume | |
| 3,967,720 | A * | 7/1976 | Arieh | 198/833 |
| 3,994,390 | A | 11/1976 | Peterson, Jr. et al. | |
| 4,574,943 | A | 3/1986 | Green | |
| 4,627,529 | A | 12/1986 | Tarlton et al. | |
| 4,711,341 | A | 12/1987 | Yu et al. | |
| 4,741,430 | A * | 5/1988 | Roinestad | 198/778 |
| 4,744,714 | A | 5/1988 | Cross, Jr. et al. | |
| 4,765,456 | A | 8/1988 | Bower | |
| 5,127,510 | A | 7/1992 | Cotter et al. | |
| 5,509,526 | A | 4/1996 | Bonnet | |
| 5,571,254 | A * | 11/1996 | Saeki et al. | 198/334 |
| 5,595,279 | A | 1/1997 | Wilkins et al. | |
| 5,988,364 | A | 11/1999 | Boyce et al. | |
| 6,176,370 | B1 * | 1/2001 | Davies | 198/867.15 |
| 6,264,042 | B1 | 7/2001 | Cossey, Jr. et al. | |
| 6,705,452 | B2 | 3/2004 | Greve et al. | |
| 6,860,376 | B1 | 3/2005 | Heit et al. | |
| 6,866,136 | B2 * | 3/2005 | Veit et al. | 198/370.02 |
| 6,868,747 | B2 * | 3/2005 | Goser et al. | 74/25 |
| 7,137,500 | B2 | 11/2006 | Fargo | |
| 7,383,936 | B2 | 6/2008 | Enomoto | |
| 7,441,646 | B2 | 10/2008 | Heit et al. | |
| 7,506,743 | B2 | 3/2009 | Enomoto | |
| 7,506,744 | B2 | 3/2009 | Enomoto | |
| 7,513,356 | B2 | 4/2009 | Veit et al. | |
| 7,562,761 | B2 | 7/2009 | Tasma et al. | |
| 7,621,392 | B2 | 11/2009 | Langsdorf et al. | |
| 7,798,306 | B2 | 9/2010 | Brayman et al. | |
| 7,857,116 | B2 | 12/2010 | Heit et al. | |
| 7,909,155 | B2 | 3/2011 | Lupton et al. | |
| 7,926,641 | B2 * | 4/2011 | Gonzalez Alemany et al. | 198/330 |
| 2005/0211534 | A1 | 9/2005 | Tefend | |
| 2009/0032374 | A1 | 2/2009 | Heit et al. | |
| 2009/0065330 | A1 | 3/2009 | Lupton et al. | |
| 2009/0139834 | A1 | 6/2009 | Brayman et al. | |
| 2011/0073444 | A1 * | 3/2011 | Wunsch | 198/833 |
| 2011/0233033 | A1 * | 9/2011 | Poels et al. | 198/845 |

OTHER PUBLICATIONS

International Preliminary Report on Patentability from corresponding Patent Cooperation Treaty Patent Application No. PCT/US2011/035943 mailed Mar. 14, 2013.

* cited by examiner

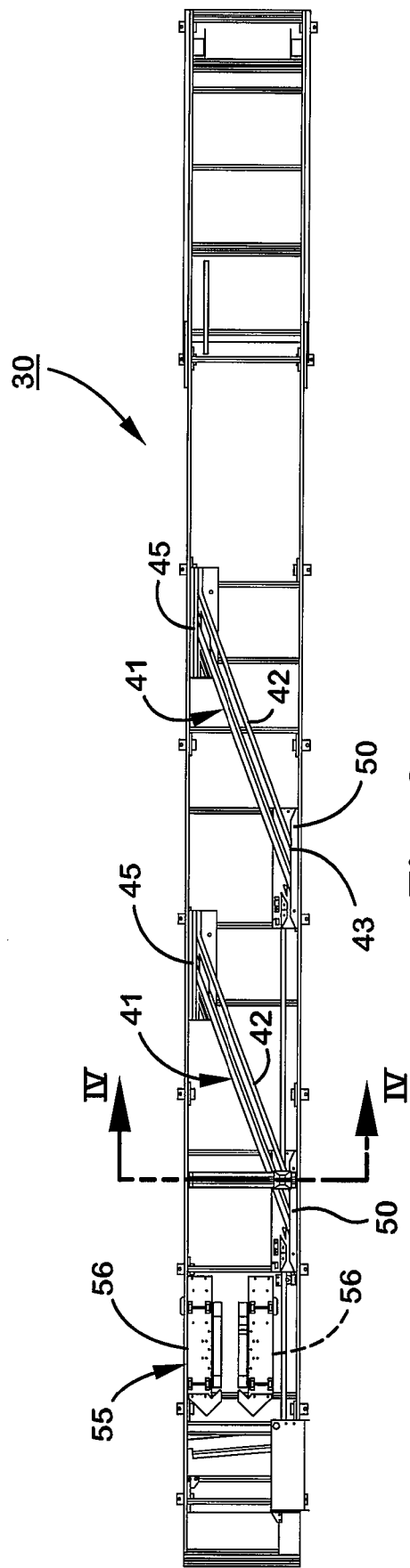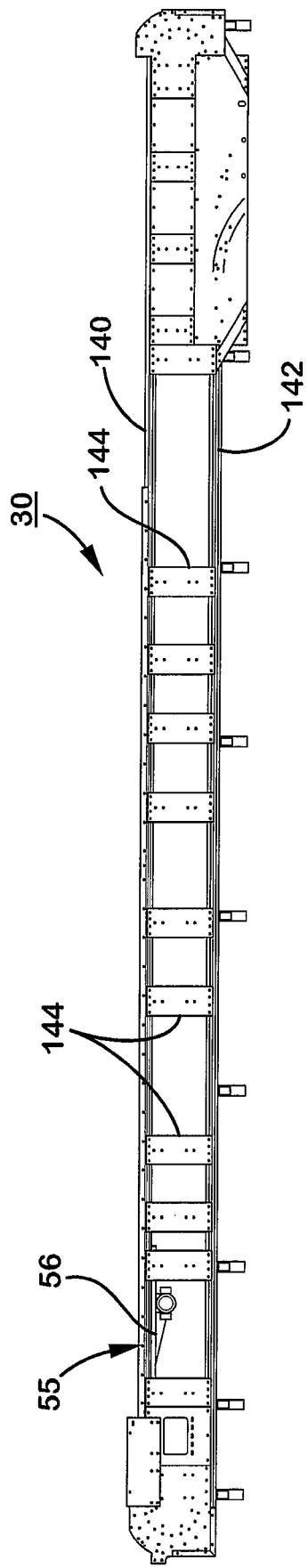

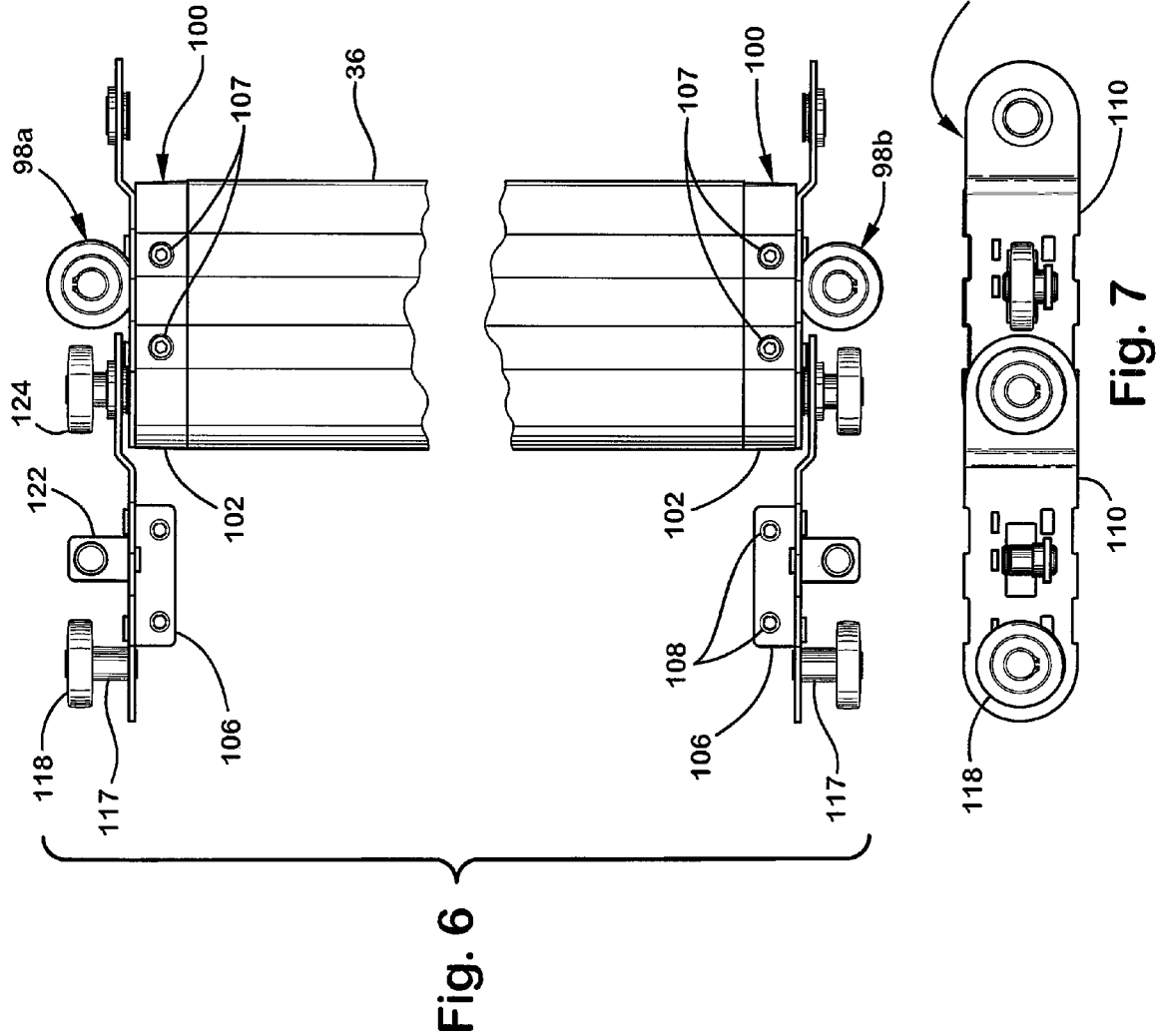

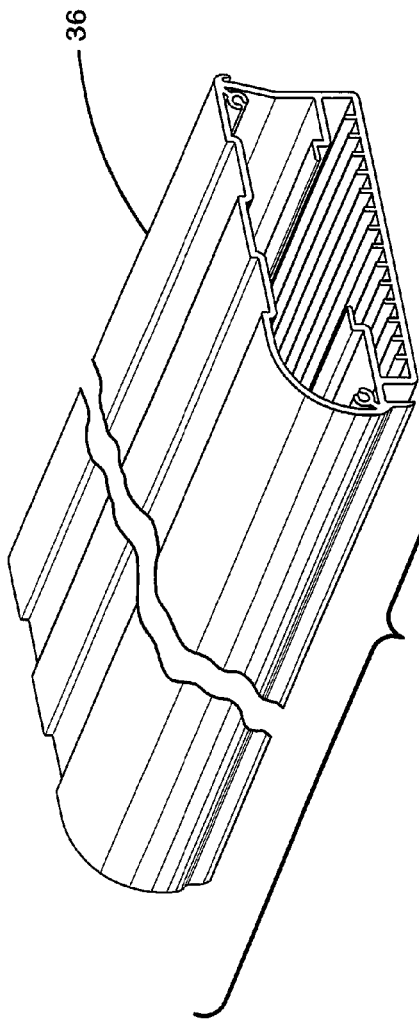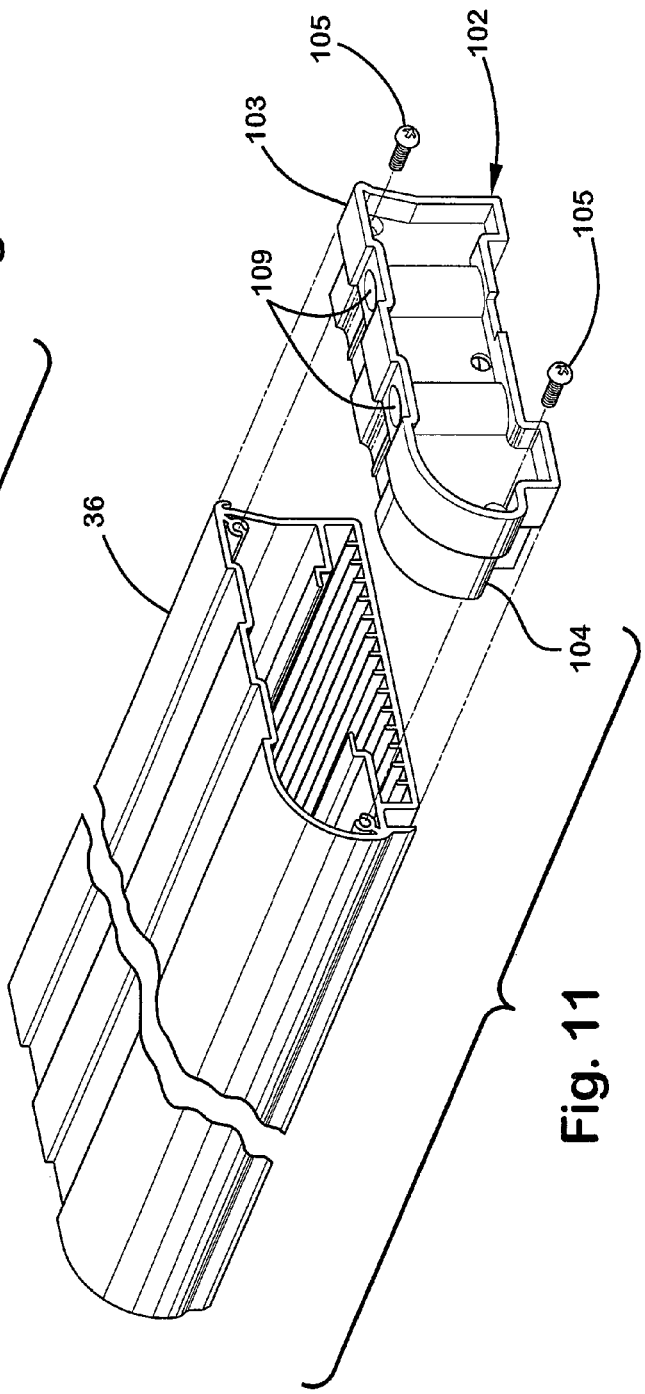

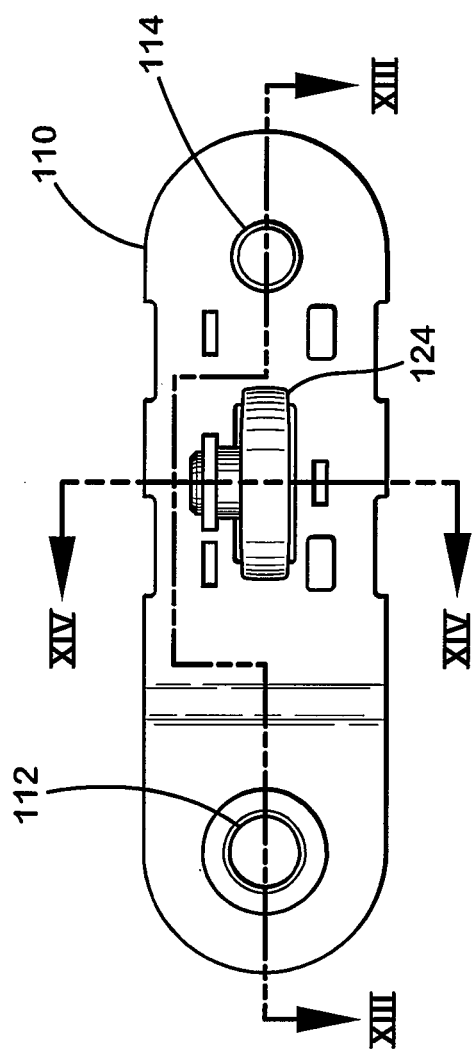
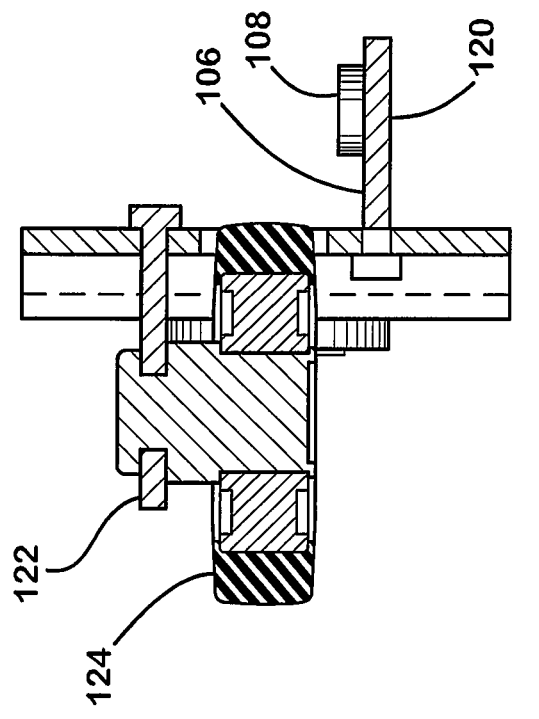
Fig. 12
Fig. 13
Fig. 14

POSITIVE DISPLACEMENT SORTER

CROSS-REFERENCE TO RELATED APPLICATION

This application claims priority from U.S. provisional patent application Ser. No. 61/377,667, filed on Aug. 27, 2010, the disclosure of which is hereby incorporated herein by reference in its entirety.

BACKGROUND OF THE INVENTION

The present invention is directed to a conveyor system and, in particular, to a positive displacement sorter made up of a travelling web, the upper surface of which defines a longitudinally travelling conveying surface. The web is defined by a series of interconnected laterally elongated slats and pusher shoes that travel along the slats. Diverting members extending below the conveying surface on each of the shoes are engaged by a particular diverting rail in order to laterally displace an article travelling on the conveying surface. The diverter selectively transfers one or more of the diverting members to an associated diverting rail to initiate the divert. The drive system propels the web.

SUMMARY OF THE INVENTION

A positive displacement sorter and method of sorting articles, according to an aspect of the invention, includes providing a plurality of interconnected parallel slats defining an endless web that travels in a longitudinal direction. The web has upper and lower runs and transition sections between the upper and lower runs. An upper surface of the upper run of the web defines an article-conveying surface. A plurality of pusher shoes travels along at least one of the slats in order to laterally displace articles on the conveying surface. Each of the shoes has a diverting member extending below the conveying surface. A plurality of diverting rails below the conveying surface is capable of engaging the diverting member to cause the associated shoe to travel laterally to divert an article. A plurality of diverters selectively diverts at least one of the diverting members from a non-diverting path extending longitudinally along the sorter to one of the diverting rails in a diverting state. A propulsion system propels the web. The propulsion system includes at least one drive assembly engaging a lower surface of the upper run or an upper surface of the lower run.

The propulsion system may include a plurality of drive assemblies that are distributed about the web. Each drive assembly may include a variable speed motor and a control establishing a speed of said motor. The variable speed motors may be driven at a common speed.

The drive assembly may include a belt having a belt surface engaging the lower surface of the upper run or said upper surface of the lower run. The belt surface may be adapted to resist slippage between the belt and the driven surface. The belt surface may include slat drive cogs that are each adapted to engage an interface between adjacent ones of the slats. At least some of the slats may have a groove formed in that slat and wherein the belt surface may include slat drive cogs that are each adapted to engage the groove in one of the slats. The slat drive cogs may include a set of first slat drive cogs that are each adapted to engage an interface between adjacent ones of the slats and a set of second slat drive cogs that are each adapted to engage the groove in one of the slats.

The drive assembly may include a drive pulley driving the belt. The belt may have pulley engaging cogs and the drive pulley has teeth engaging these cogs. One or more pressure pulleys may be provided in order to press the belt against the driven surface. The cogs on the belt may extend only partially across a width of the belt thereby defining a generally planar edge portion where the belt is engaged by the pressure pulley(s). The pressure pulley(s) may include a recessed area and a flange adjacent the recessed area. In this manner, the recessed area accommodates the cogs and the flanges engage the generally planar edge portion of the belt. Some of the pressure pulleys may engage one edge portion of the belt and other of the pressure pulleys engage an opposite edge portion of the belt. The pressure pulleys engaging one edge portion of the belt may be offset from the pressure pulleys engaging the opposite edge portion of the belt in the longitudinal direction.

The drive assembly may include one or more non-driven idler pulleys guiding the belt at opposite ends of the belt. The idler pulleys may be spaced away from the driven surface. The drive assembly may include a deflector shield deflecting any of the diverting members approaching the drive assembly. The drive assembly may include a support base and an operational assembly mounted to the support base by a plurality of mounts. The mounts may accommodate limited motion between the support base and the operational assembly. The mounts may include springs biasing the operational assembly against the driven surface.

A drive assembly for a positive displacement sorter, according to an aspect of the invention, includes a belt having a belt surface that is adapted to engage a driven surface defined by a lower surface of an upper run of a web made up of interconnected slats or an upper surface of a lower run of the web. The drive assembly includes a drive pulley driving the belt. The belt surface includes a plurality of slat drive cogs, each adapted to engage a vertical surface of one of the slats.

At least some of the slat drive cogs may each be adapted to engage an interface between adjacent ones of the slats. At least some of said slats may have a groove formed in that slat and wherein at least some of said slat drive cogs may each be adapted to engage the groove in one of the slats. At least some of said slats have a groove formed in that slat and the slat drive cogs may include a set of first slat drive cogs each adapted to engage an interface between adjacent ones of the slats and a set of second slat drive cogs each adapted to engage the groove in one of the slats. The first slat drive cogs may have a different configuration from the second slat drive cogs.

The belt may have pulley interface cogs on a surface opposite the slat drive cogs, with the pulley interface cogs engaging teeth in the drive pulley. The drive assembly may include at least one pressure pulley pressing the belt against the driven surface and wherein said pulley interface cogs may extend only partially across a width of said belt thereby defining a generally planar edge portion of the belt. The pressure pulley(s) may include a recessed area and at least one flange adjacent the recessed area, with the recessed area accommodating the pulley interface cogs and the at least one flange engaging the edge portion of the belt.

Some of the pressure pulleys may engage one edge portion of the belt and the other of the pressure pulleys engage an opposite edge portion of the belt. Some of the pressure pulleys may be offset from the other of the pressure pulleys in the longitudinal direction.

A drive belt for a drive assembly of a positive displacement sorter, according to an aspect of the invention, includes a belt surface that is adapted to engage a driven surface made up of a lower surface of the upper run of a web made up of interconnected slats or an upper surface of the lower run of the web. The belt surface has slat drive cogs, each adapted to engage a vertical surface of one of the slats.

The slat drive cogs may include a set of first slat drive cogs each adapted to engage an interface between adjacent ones of the slats and a set of second slat drive cogs each adapted to engage a groove in one of the slats. The first slat drive cogs may have different shapes than said second slat drive cogs. Pulley interface cogs may be formed on a surface opposite from the belt surface. The pulley interface cogs are adapted to engage teeth in a drive pulley of the drive assembly.

A positive displacement sorter, according to another aspect of the invention, includes a plurality of interconnected parallel slats defining an endless web that travels in a longitudinal direction. The web has upper and lower runs and transition sections between the upper and lower runs. An upper surface of the upper run of the web defines an article-conveying surface. A plurality of pusher shoes travels along at least one of the slats in order to laterally displace articles on the conveying surface. Each of the shoes has a diverting member extending below the conveying surface. A plurality of diverting rails below the conveying surface is capable of engaging the diverting member to cause the associated shoe to travel laterally to divert an article. A plurality of diverters selectively diverts at least one of the diverting members from a non-diverting path extending longitudinally along the sorter to one of the diverting rails in a diverting state. A propulsion system propels the web. The web includes a wheel assembly at each lateral end of the slats to interconnect the slats and to provide moveable support to the web. A separable interface is provided between each lateral end of each of the slats and the wheel assembly. The separable interface is generally vertically separable.

The separable interface may include an insert engaging the lateral end of the slat and a generally horizontal member on the wheel assembly that vertically supports the insert. The insert may have a first portion that engages an interior of the corresponding one of the slats and an outer portion extending laterally beyond the corresponding one of the slats.

The insert may define fastener-receiving openings that are aligned with fasteners at the generally horizontal member. The wheel assembly may include a plurality of connector plates, each supporting one of the generally horizontal members and wheel support openings at opposite ends of the connector plate. One of the wheel support openings on one of said connector plates may be concentric with another of the wheel support openings on an adjacent one of the connector plates. A wheel axle may extend through one of the wheel support openings and be fastened at the other of the wheel support opening in order to interconnect adjacent ones of the connector plates.

The horizontal member may be defined by a support plate that is welded to the connector plate. The support plate may pass through the connector plate and define a horizontal wheel support portion on an opposite side of the connector plate from the horizontal member. The horizontal wheel support portion may support a side thrust wheel.

A positive displacement sorter, according to yet another aspect of the invention, includes a plurality of interconnected parallel slats defining an endless web that travels in a longitudinal direction. The web has upper and lower runs and transition sections between the upper and lower runs. An upper surface of the upper run of the web defines an article-conveying surface. A plurality of pusher shoes travels along at least one of the slats in order to laterally divert articles on the conveying surface. Each of the shoes has a diverting member extending below the conveying surface. A plurality of diverting rails below the conveying surface is capable of engaging the diverting member to cause the associated shoe to travel laterally to divert an article. A plurality of diverters selectively diverts at least one of the diverting members from a non-diverting path extending longitudinally along the sorter to one of the diverting rails in a diverting state. A propulsion system propels the web. A frame moveably supports the web and is made up of spaced apart first and second lateral side assemblies and lateral cross members interconnecting the side assemblies.

The first lateral side assembly may include first upper and first lower track members and a first plate. The first plate provides generally rigid interconnection between the first upper and first lower track members. The second lateral side assembly may be made up of second upper and second lower track members and a second plate. The second plate provides generally rigid interconnection between the second upper and second lower track members.

The web may include a pair of wheel assemblies, one at each lateral end of the slats to interconnect the slats and to provide moveable support to the web. The wheel assemblies are moveably supported by the first and second upper track members and the first and second lower track members. The first and second upper track members and the first and second lower track members may be made from substantially identical extrusions. The lateral cross members connect with said first and second plates. The propulsion system may include at least one drive assembly engaging a lower surface of the upper run or an upper surface of the lower run. The drive assemblies may be supported by the lateral cross members.

These and other objects, advantages and features of this invention will become apparent upon review of the following specification in conjunction with the drawings.

BRIEF DESCRIPTION OF THE DRAWINGS

FIG. 2 is a side elevation of the sorter in FIG. 1;

FIG. 3 is a top plan view of the sorter in FIG. 1;

FIG. 6 is a top plan view of a portion of the web;

FIG. 7 is an end elevation of the portion of the web in FIG. 6;

FIG. 10 is a perspective view of the end of a slat extrusion;

FIG. 11 is an exploded perspective view of the end of a slat assembly;

FIG. 12 is a side elevation of a portion of a wheel assembly;

FIG. 13 is a sectional view taken along the lines XIII-XIII in FIG. 12;

FIG. 14 is a sectional view taken along the lines XIV-XIV in FIG. 12;

DESCRIPTION OF THE PREFERRED EMBODIMENT

Figure 1:
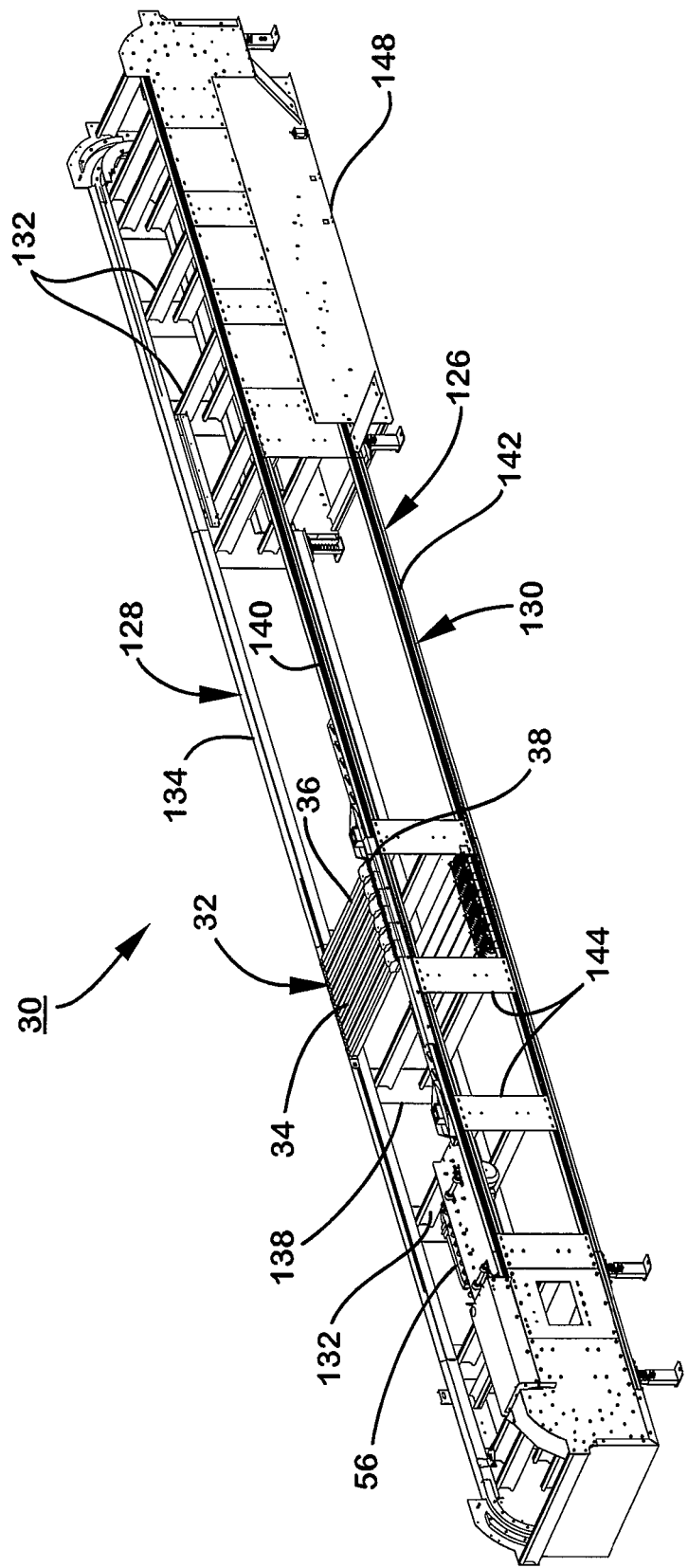
FIG. 1 is a perspective view of a positive displacement sorter according to an embodiment of the invention.

Referring now to the drawings and the illustrative embodiments depicted therein, a positive displacement sorter 30 includes an endless web 32 travelling in a longitudinal direction, the upper surface of which defines an article-conveying surface 34 (FIG. 1). Web 32 is defined by a series of laterally elongated parallel slats 36 interconnected at their ends. A plurality of pusher shoes 38 travels along one or more of the slats in order to laterally divert an article on conveying surface 34, such as to a particular takeaway lane made up of a powered or gravity conveyor or chute (not shown). Sorter 30 may generally incorporate various features of positive displacement sorters, such as of the type disclosed in commonly assigned U.S. Pat. Nos. 5,127,510; 6,814,216; 6,860,383; 6,866,136; 7,086,519; 7,117,988; 7,513,356; and 7,240,781; and U.S. Pat. Application Publication Nos. 2009/0139834 A1 and 2011/0042181 A1, the disclosures of which are hereby incorporated herein by reference.

Figure 4:
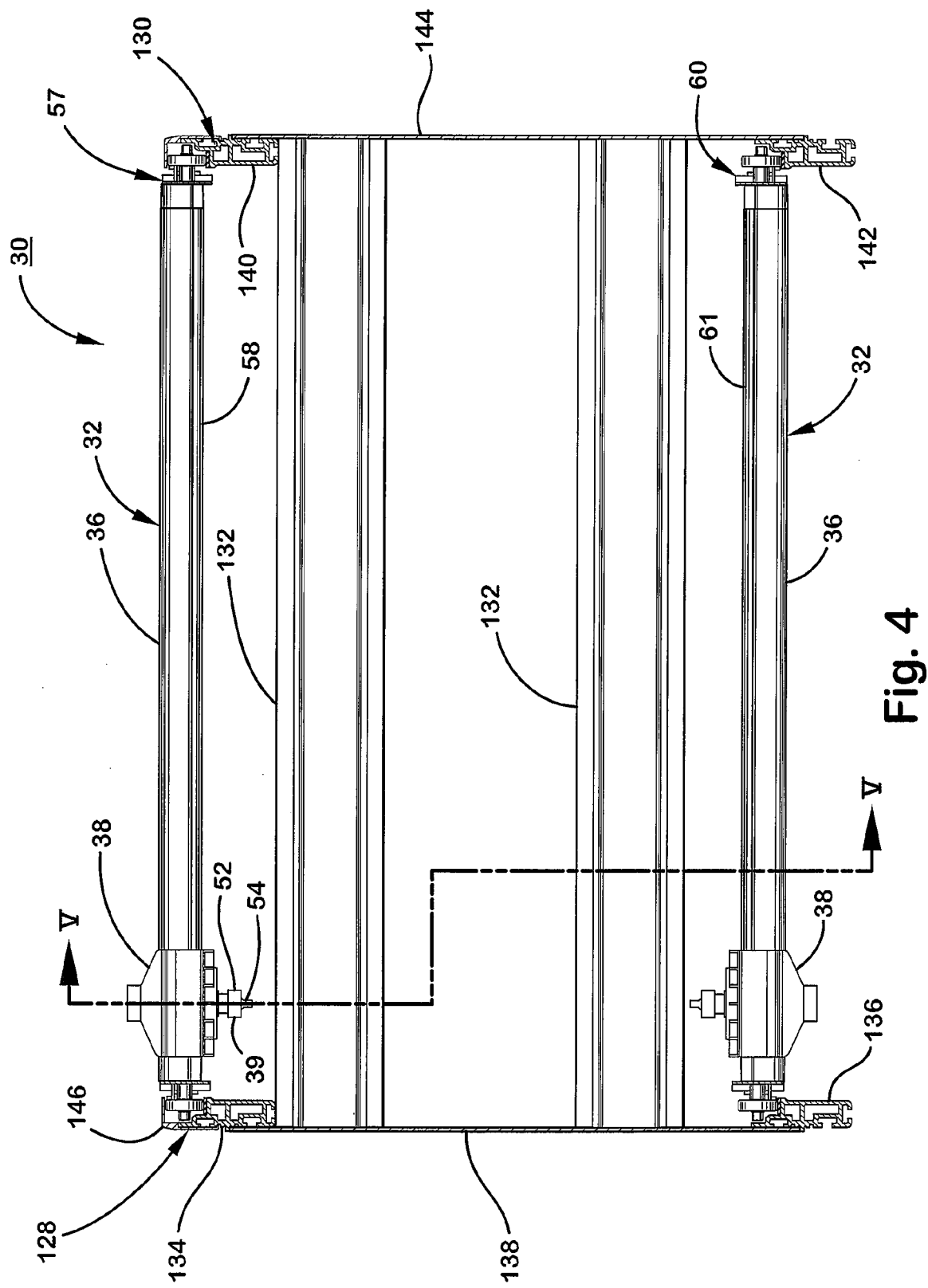
FIG. 4 is a sectional view taken along the lines IV-IV in FIG. 3.
Figure 5:
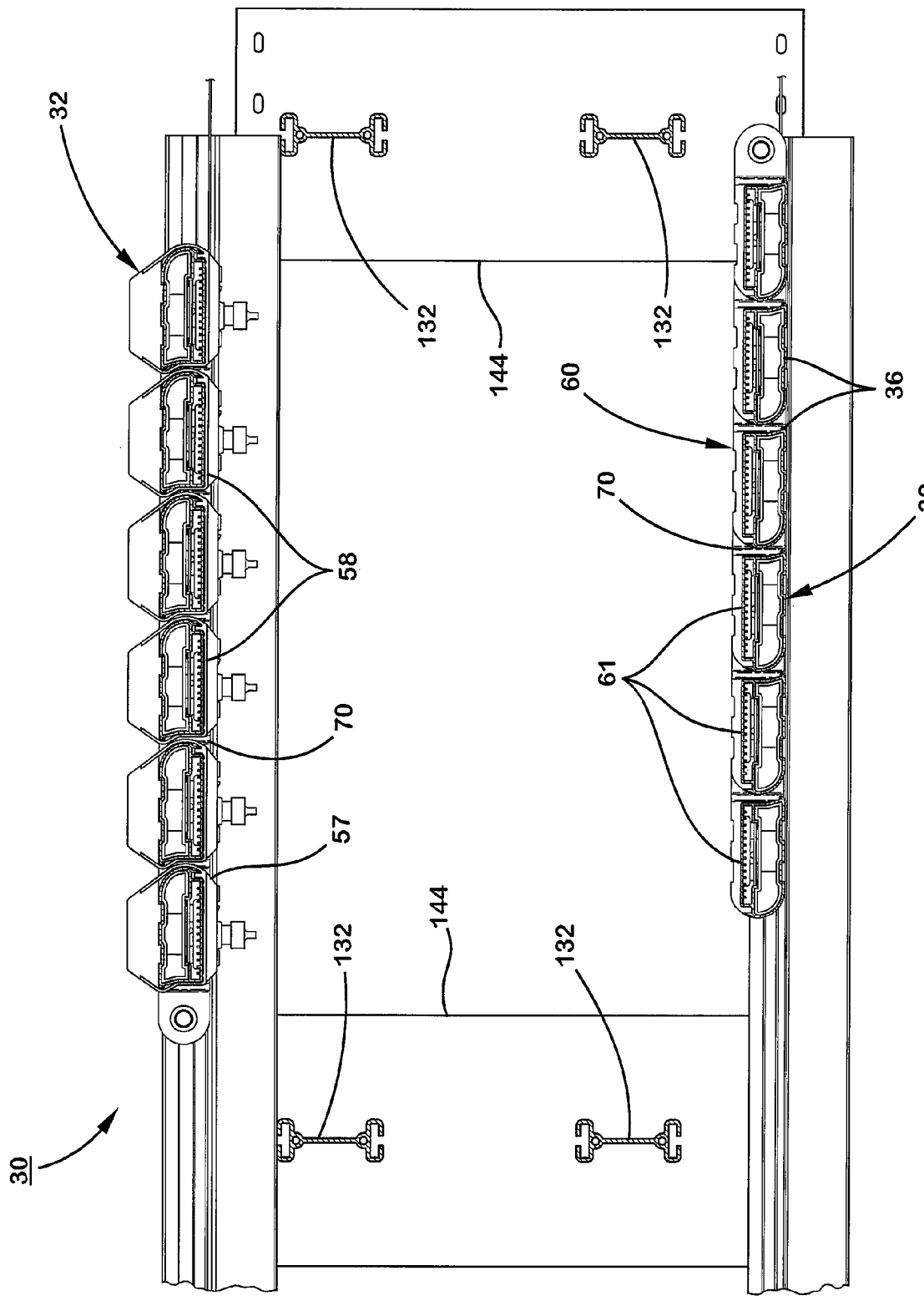
FIG. 5 is a sectional view taken along the lines V-V in FIG. 4.
Figure 8:
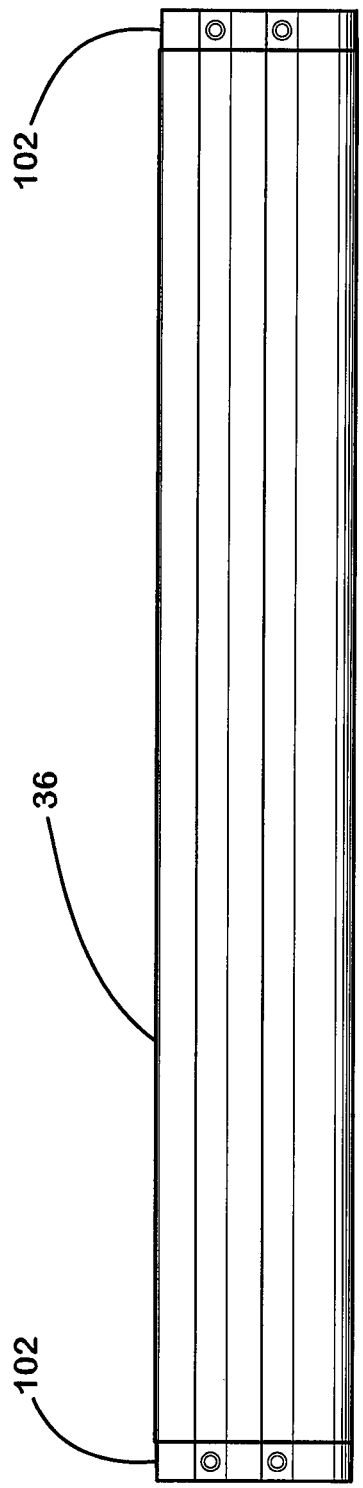
FIG. 8 is a top plan view of a slat assembly.
Figure 9:
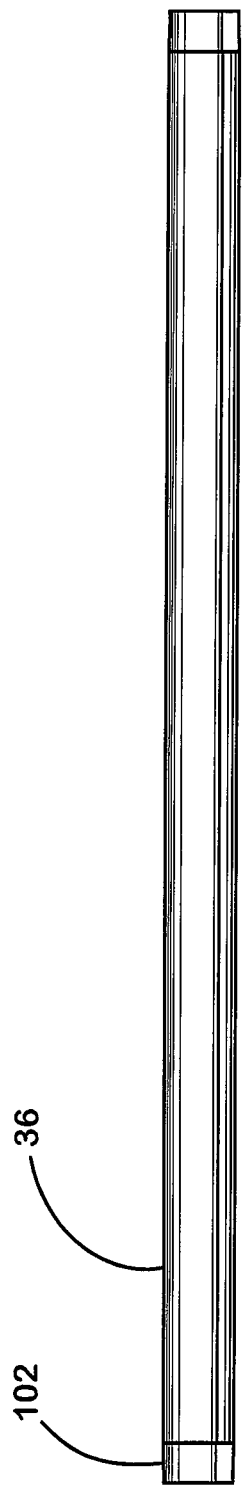
FIG. 9 is a front elevation of the slat assembly in FIG. 8.
Figure 15:
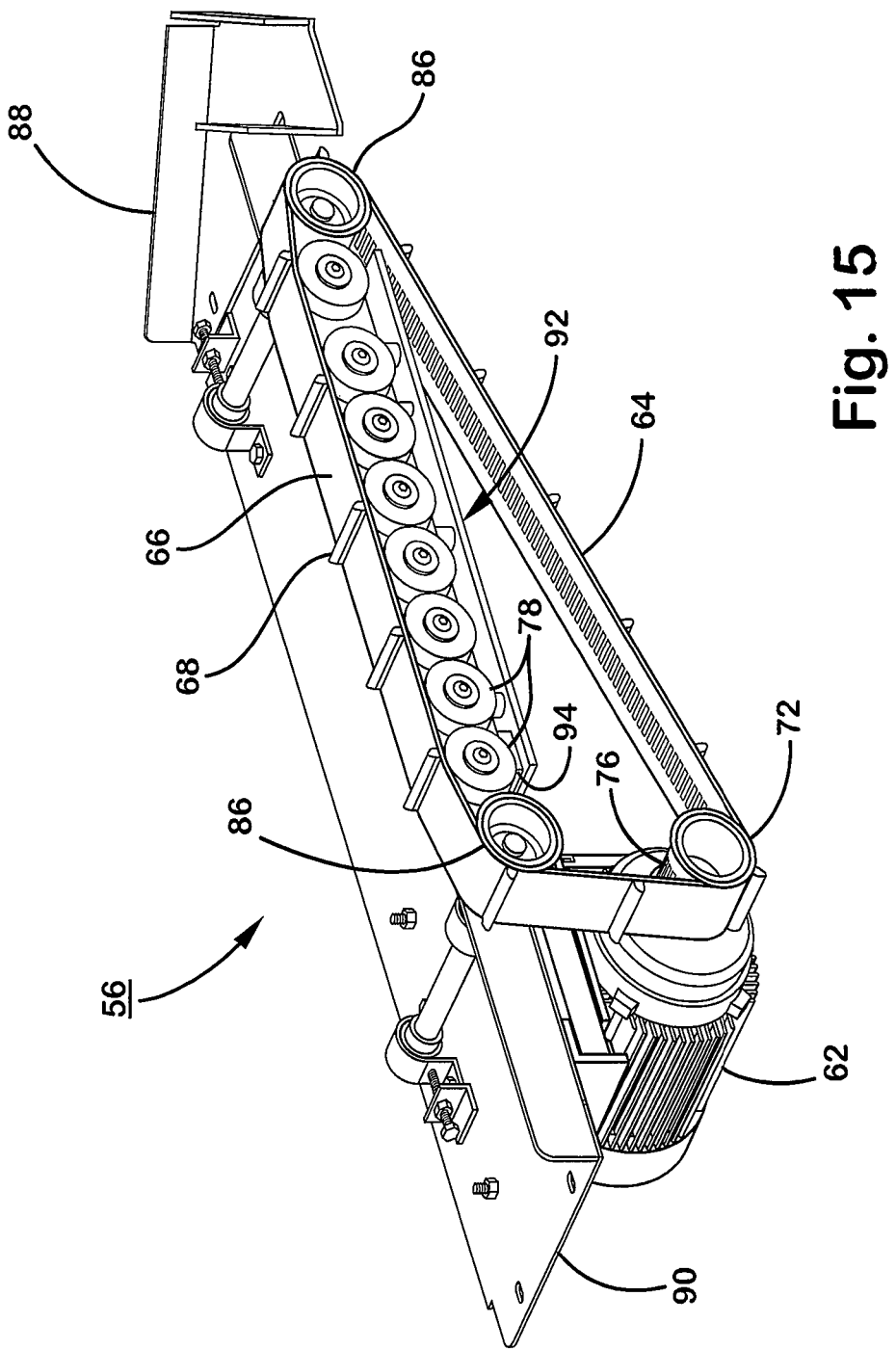
FIG. 15 is a perspective view of a drive assembly.
Figure 16:
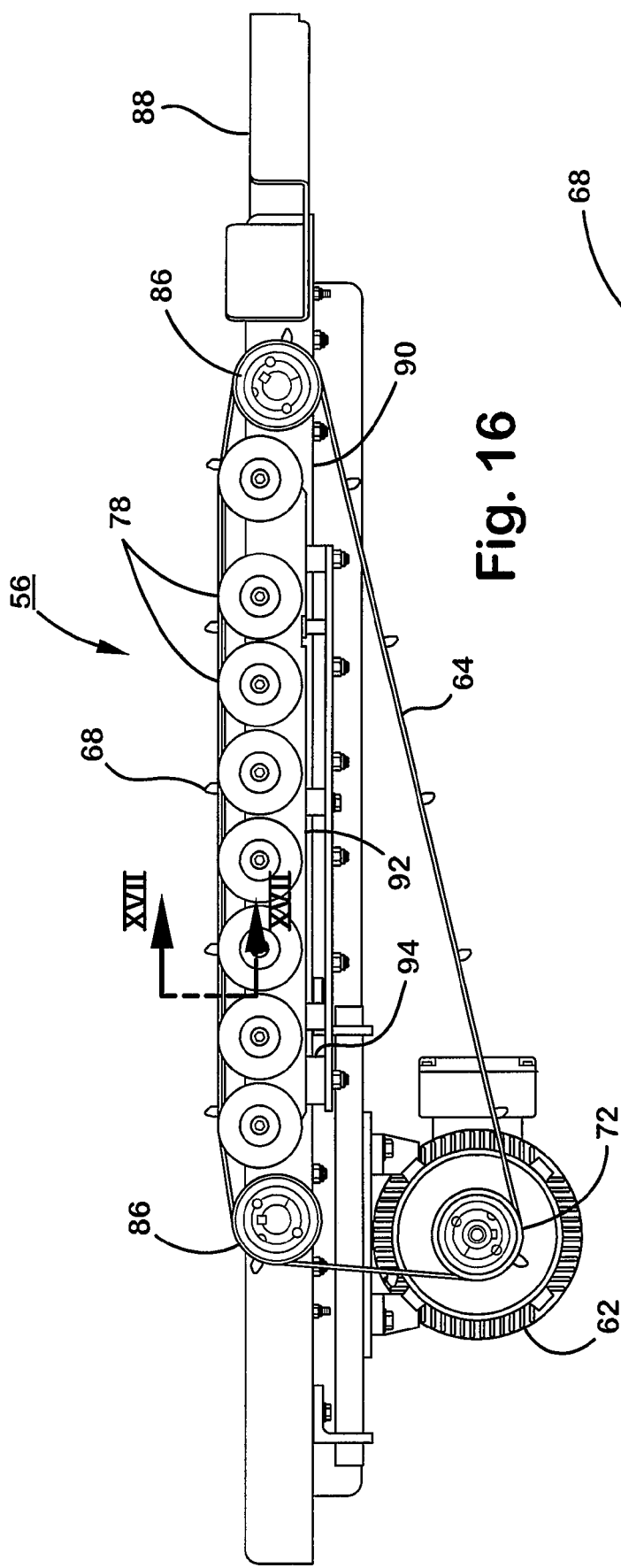
FIG. 16 is a side elevation of the drive assembly in FIG. 15.

Each of shoes 38 includes a diverting member 39 extending below conveying surface 34 in order to laterally displace the pusher shoe, as will be described in more detail below (FIG. 4). Diverting member 39 may include a bearing 52 and a pin 54 extending coaxially below the bearing.

Sorter 30 further includes a diverting assembly 41 below conveying surface 34 for each divert destination. Diverting assembly 41 includes a diverter module 50 made up of a plurality of diverters 43 and one or more diverting rails 42 which terminate at a terminal assembly 45. Each diverter 43 is capable of selectively diverting one or more diverting members 39 from a non-diverting path 40 to a diverting rail 42 extending from that diverter assembly in order to cause the associated pusher shoe 38 to travel laterally across conveying surface 34 to thereby laterally displace an article (not shown) travelling on the conveying surface. Diverters 43 may be mechanical diverters, electromagnetic diverters or a combination of both. A non-diverting path extends longitudinally along sorter 30 under conveying surface 34 to guide diverting member 39 of shoes until they are diverted. Each of diverting rails 42 is capable of engaging diverting member 39, such as at bearing 52 or, alternatively, at pin 54, to cause the associated shoe 38 to travel laterally to divert an article. Each diverting rail 42 may be combined with a nose 51 to demark the divergence of a diverting rail from the non-diverting path.

Positive displacement sorter 30 includes a propulsion system 55 propelling web 32. The propulsion system includes one or more drive assemblies 56 that may be positioned to engage a lower surface 58 of an upper run 57 of web 32. Alternatively, or additionally, a drive assembly 56 may be positioned to engage an upper surface 61 of a lower run 60 of web 32. In the illustrated embodiment, propulsion system 55 is made up of a plurality of drive assemblies 56 that are distributed about web 32. This allows the web to be of any practical length desired with the number of drive assemblies provided to accommodate the length of the web. In the illustrated embodiment, drive assemblies 56 are spaced apart approximately 80 feet, but a greater or lesser spacing may be provided. In the illustrated embodiment, drive assemblies 56 are the sole driving means in propulsion system 55 for propelling web 32. However, it should be understood that drive assemblies 56 could alternatively be used in combination with a different primary driver, such as a conventional end sprocket driven by a large electric motor. In such alternative configurations, drive assemblies 56 would provide an auxiliary boost to the primary driver of the web. Other arrangements will be apparent to the skilled artisan.

Each drive assembly 56 includes a motor, such as a variable speed motor 62 and a control (not shown) that establishes a speed of motor 62 (FIGS. 15-18). Motor 62 may be a variable frequency rated AC motor, a variable speed servo motor, or the like. In the illustrated embodiment, motor 62 is 3-horsepower. Variable speed motors 62 are driven at a common speed and may be adjusted in speed depending upon conditions of the conveyor system in which sorter 30 is located, such as disclosed in commonly assigned U.S. Patent Application Publication No. 2009/0065330 A1, published on Mar. 12, 2009, by Clinton R. Lupton et al., the disclosure of which is hereby incorporated herein by reference. Alternatively, a fixed speed motor may be used.

Drive assembly 56 includes a belt 64 having a belt surface 66 that engages lower surface 58 or upper surface 61. Belt surface 66 is adapted to resist slippage between belt 64 and surface 58/61. While this may be accomplished by providing a high friction surface characteristic to surface 66 or a series of complementary peaks and valleys between belt surface 66 and the surface 58/61, in the illustrated embodiment, belt surface 66 includes an outwardly projecting slat drive cog 68 engaging an interface 70 between adjacent slats 36. In the illustrated embodiment, a slat drive cog 68 is provided at each interface 70, but could be provided at every other interface, or the like. In the illustrated embodiment, belt 64 and slat drive cogs 68 are each made from a urethane and are welded together. It would be apparent to the skilled artisan that they could be formed in common with each other in one process or from other polymeric materials.

Figure 17:
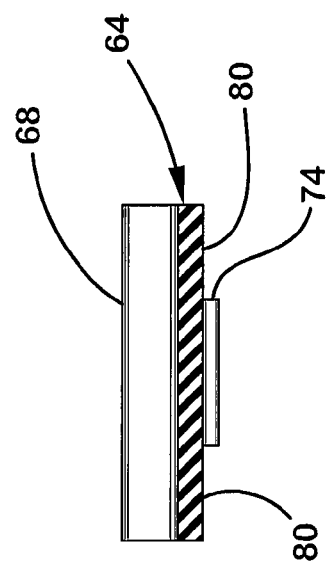
FIG. 17 is a sectional view taken along the lines XVII-XVII in FIG. 16.
Figure 18:
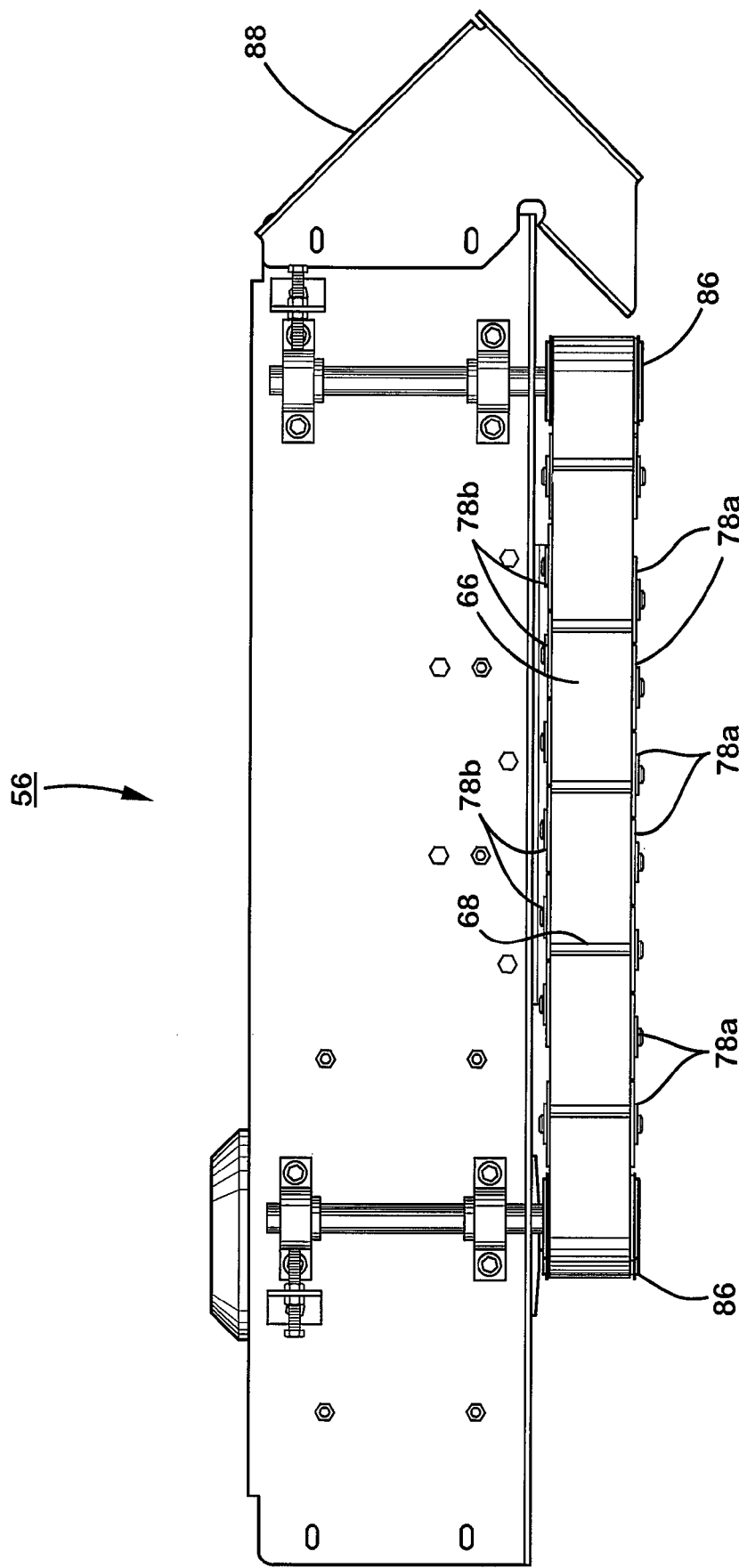
FIG. 18 is a top plan view of the drive assembly in FIG. 15.
Figure 19:
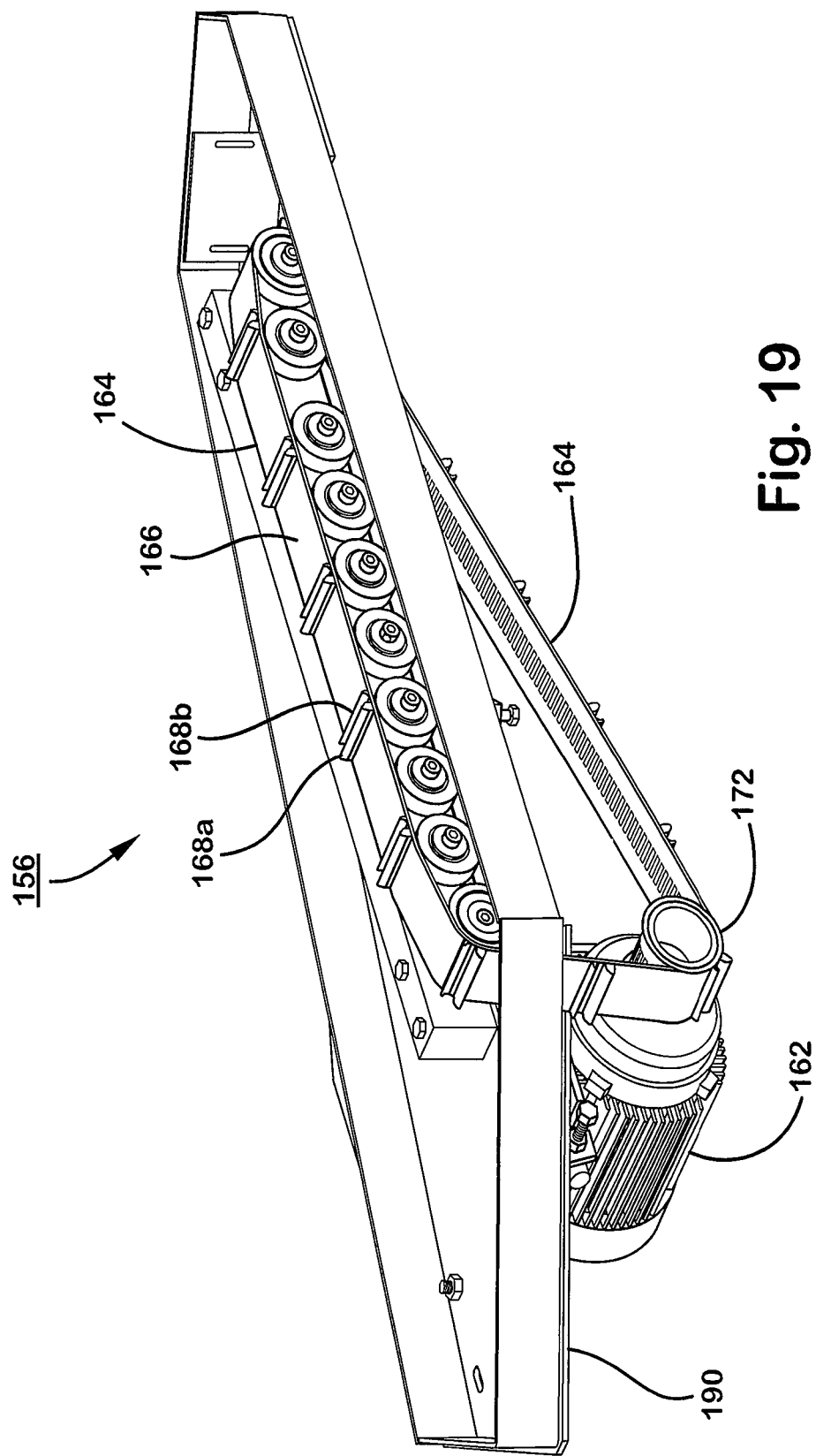
FIG. 19 is the same view as FIG. 15 of an alternative embodiment thereof.
Figure 20:
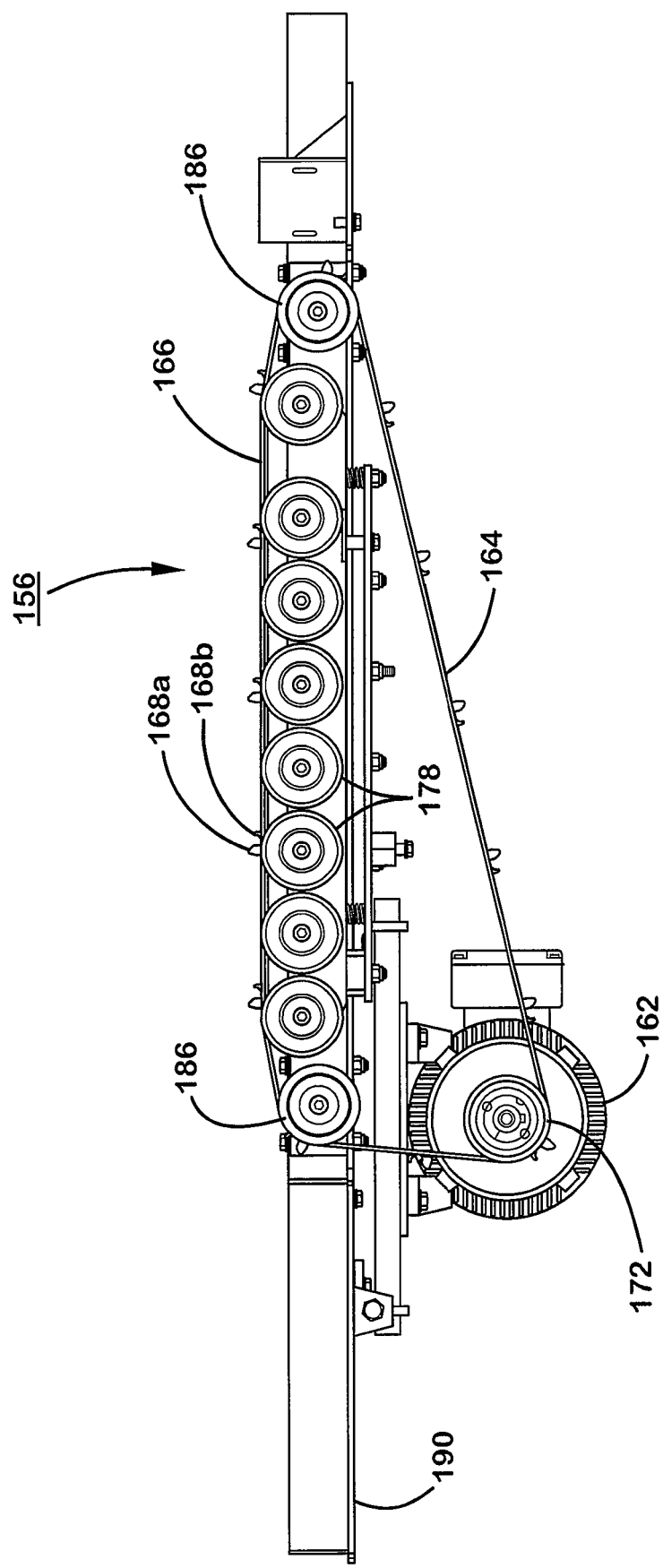
FIG. 20 is the same view as FIG. 16 of the drive assembly in FIG. 19.
Figure 21:
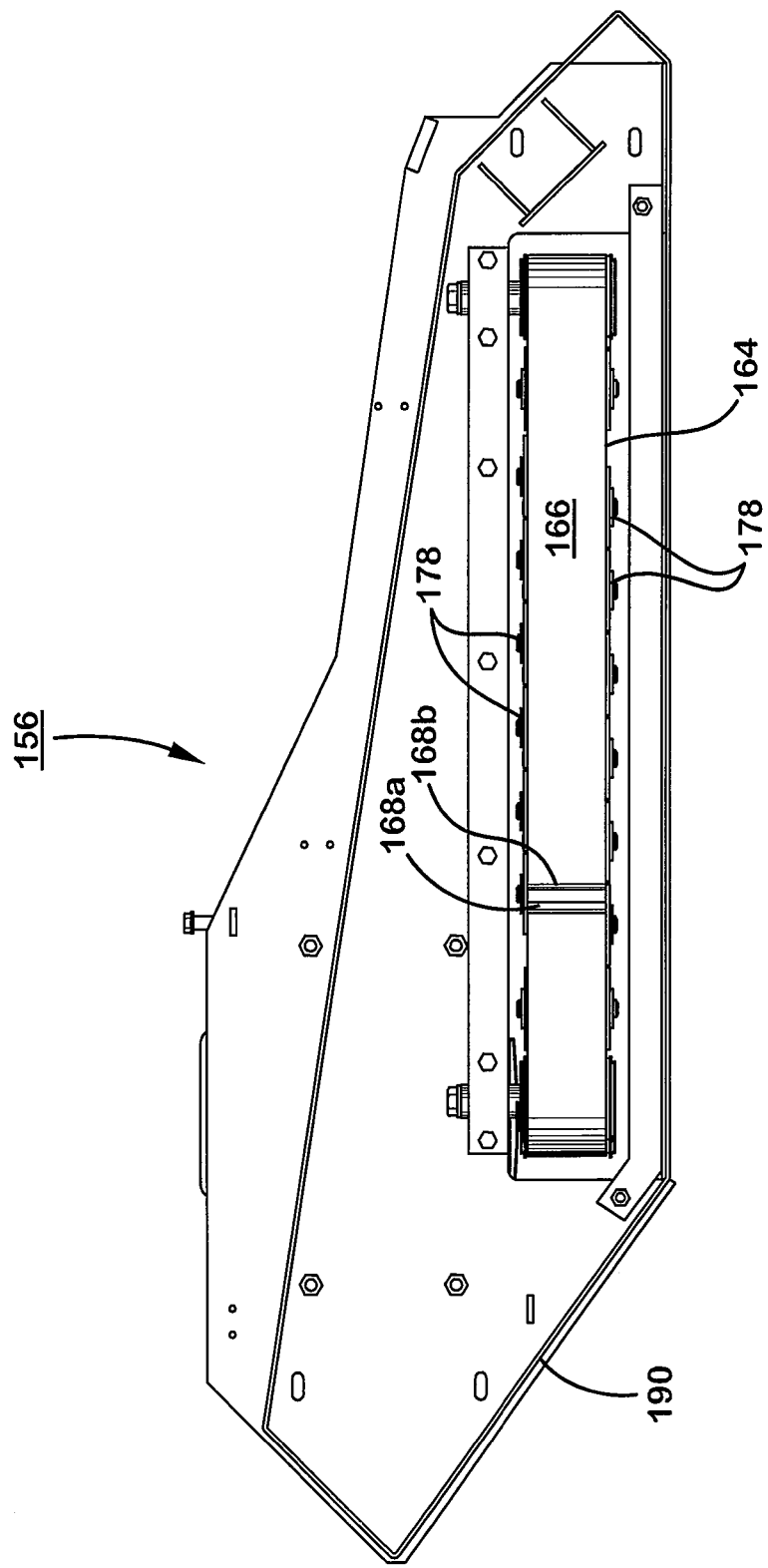
FIG. 21 is the same view as FIG. 18 of the drive assembly in FIG. 19.
Figure 22:
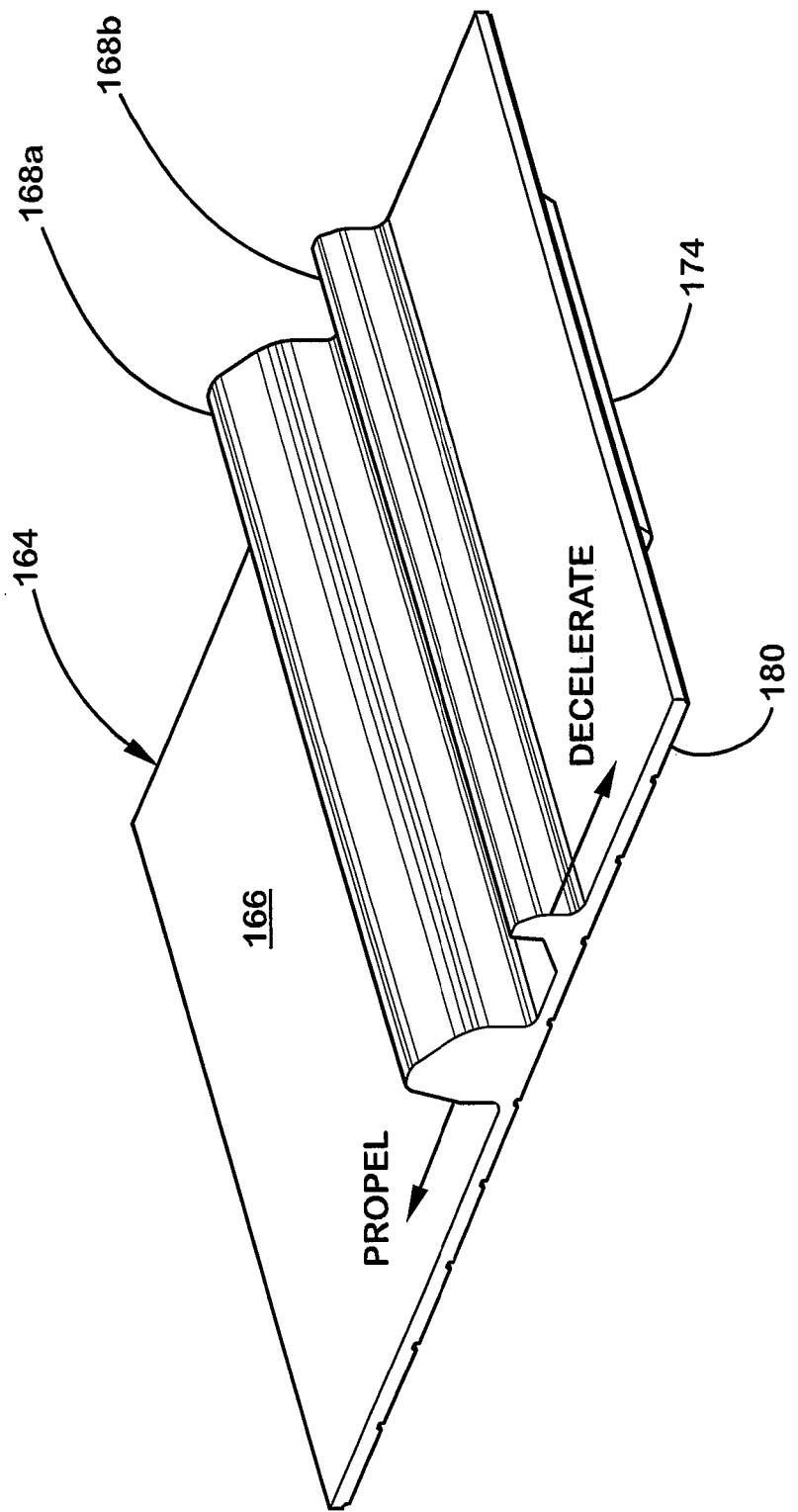
FIG. 22 is a perspective view of a portion of the top side of a drive belt.
Figure 23:
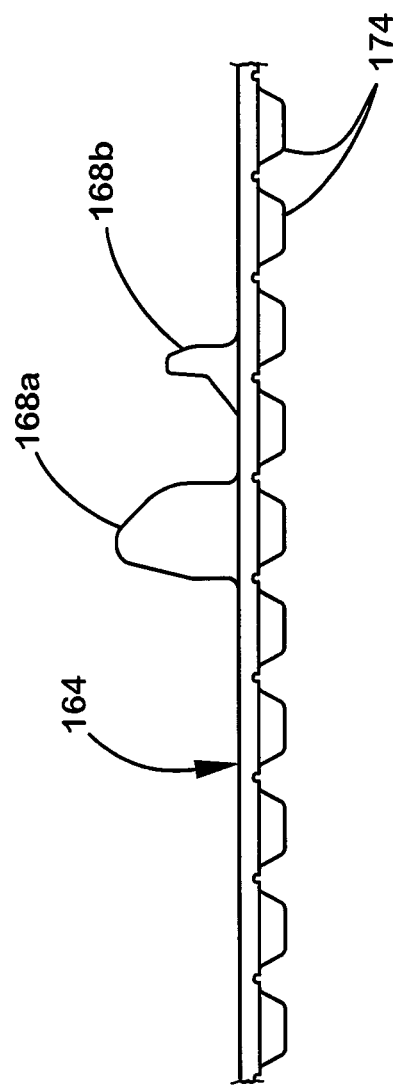
FIG. 23 is a side elevation of the drive belt in FIG. 22.
Figure 24:
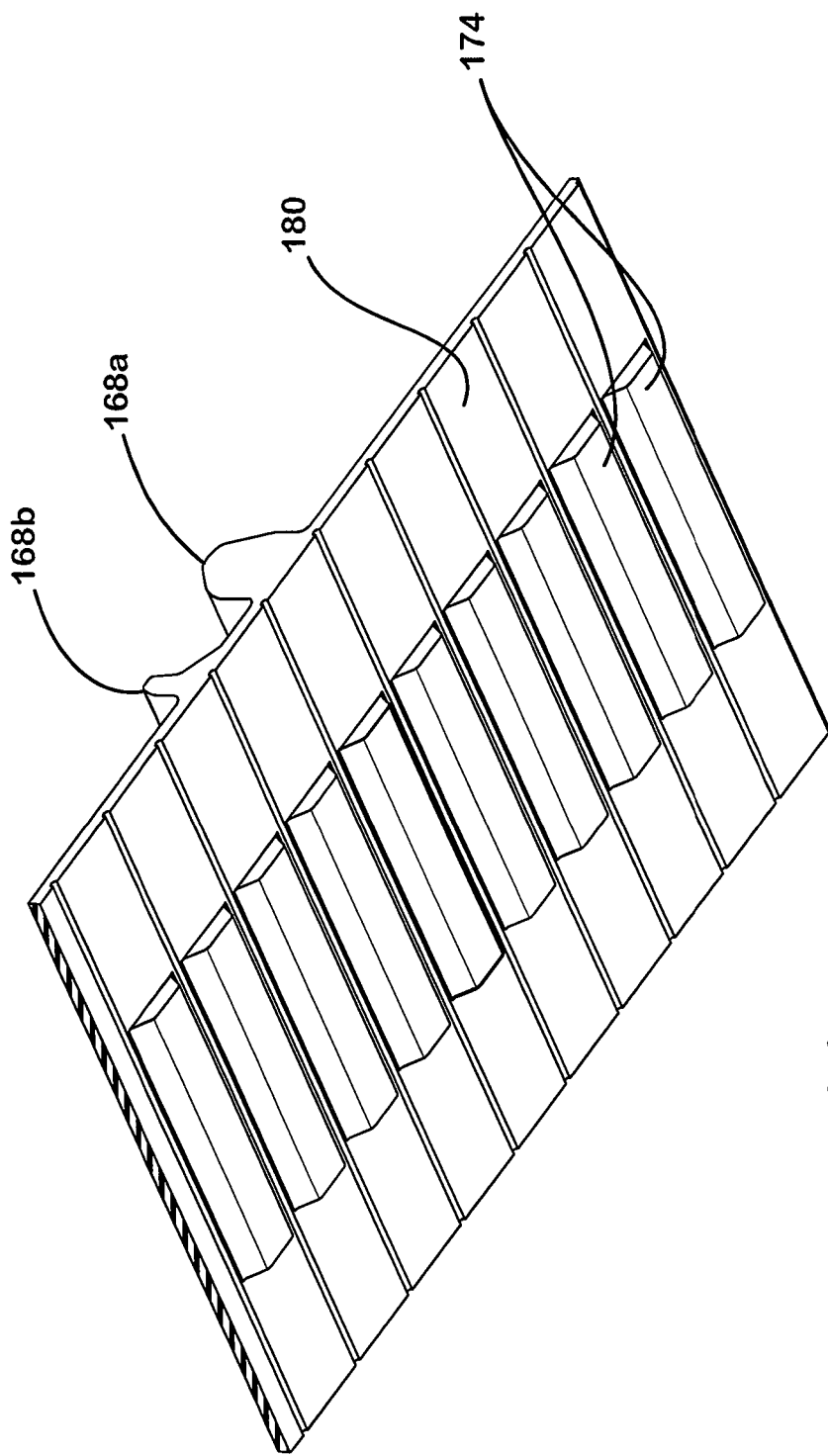
FIG. 24 is a perspective view of the underside of the drive belt in FIG. 22.
Figure 25:
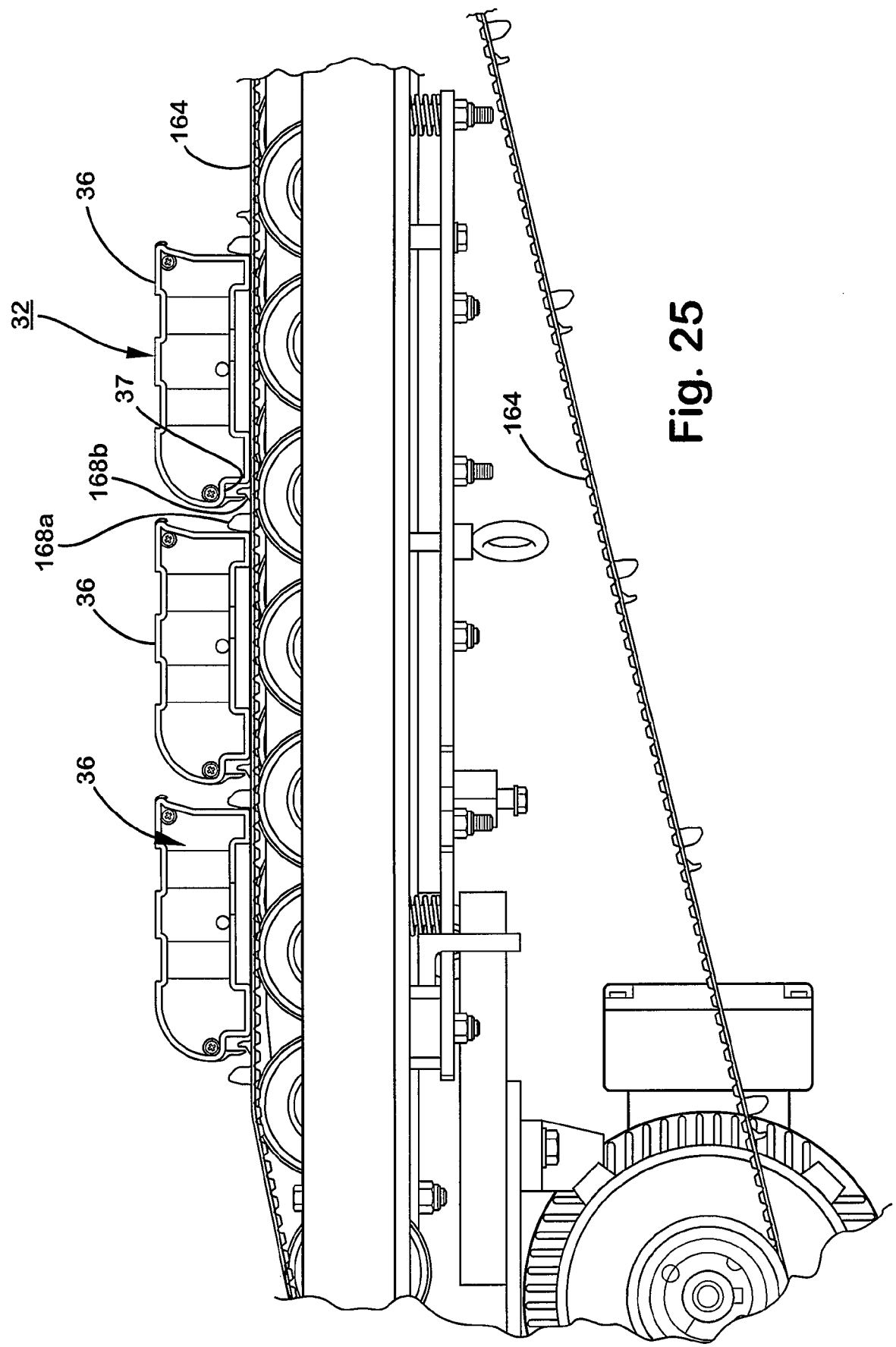
FIG. 25 is a side elevation of the drive assembly in FIG. 15 driving a web.
Figure 26:
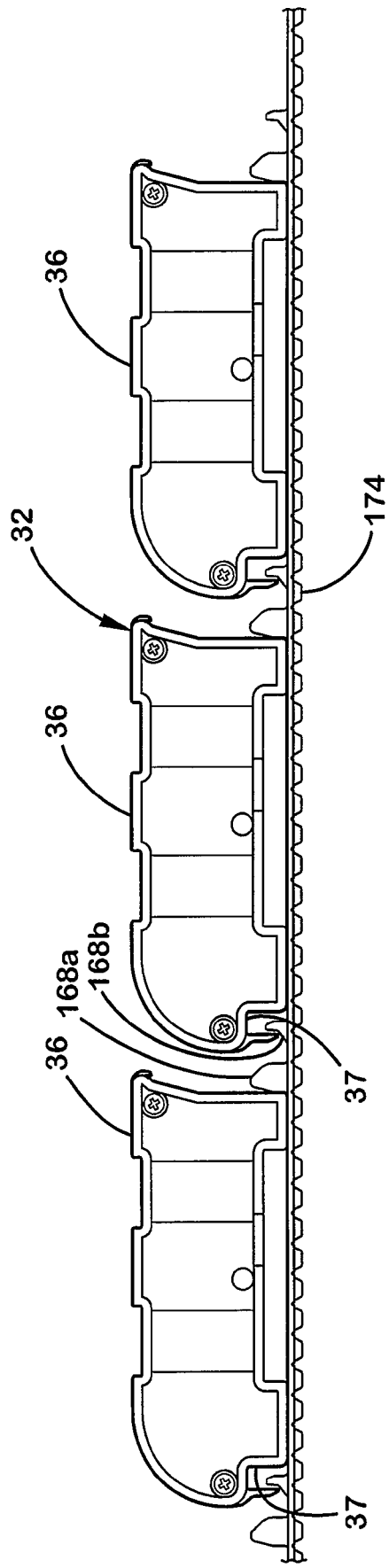
FIG. 26 is the same general view as FIG. 25 illustrating the interface between the drive belt and the slats making up the web.
Figure 27:
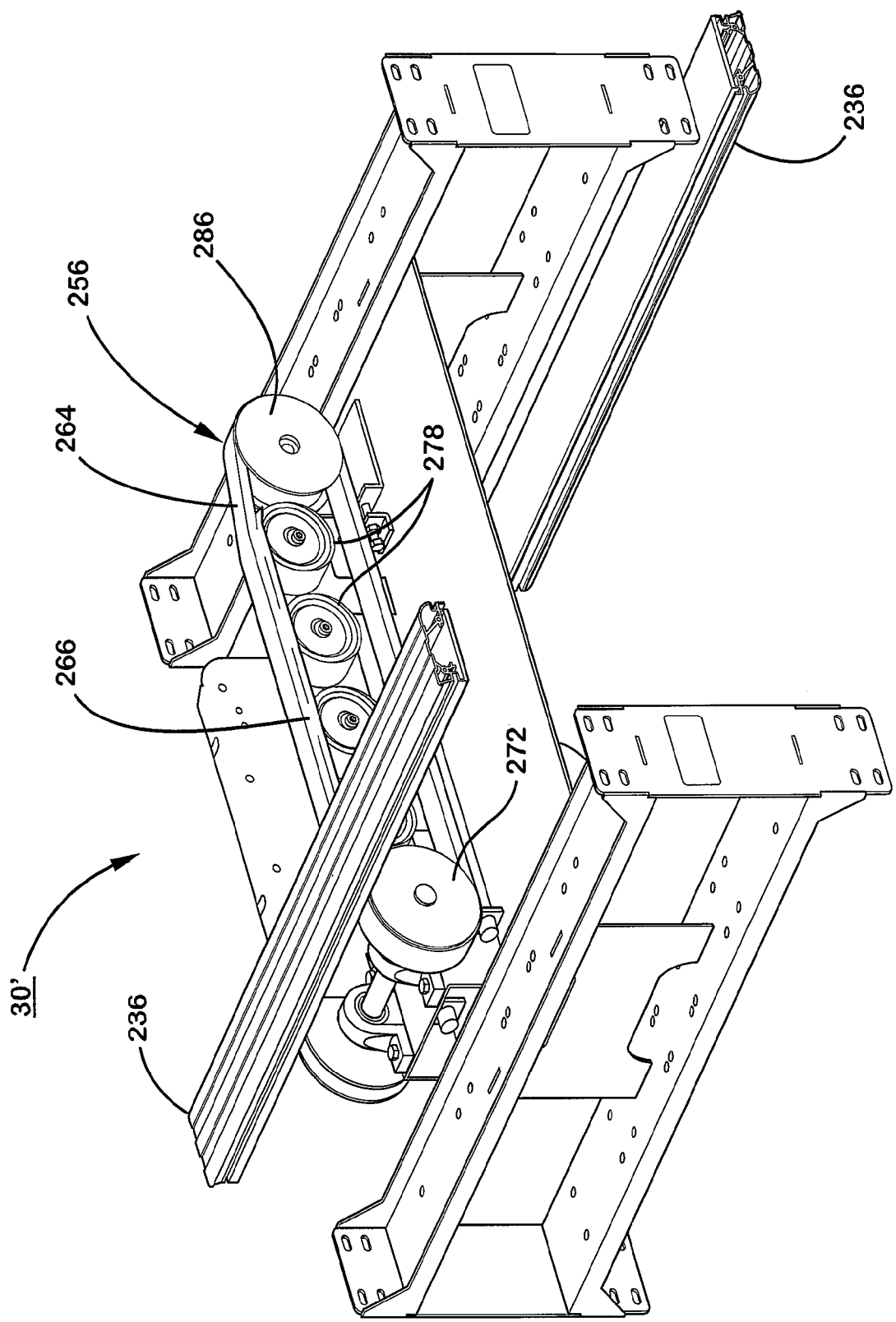
FIG. 27 is a perspective view of another alternative embodiment of a drive assembly.
Figure 28:
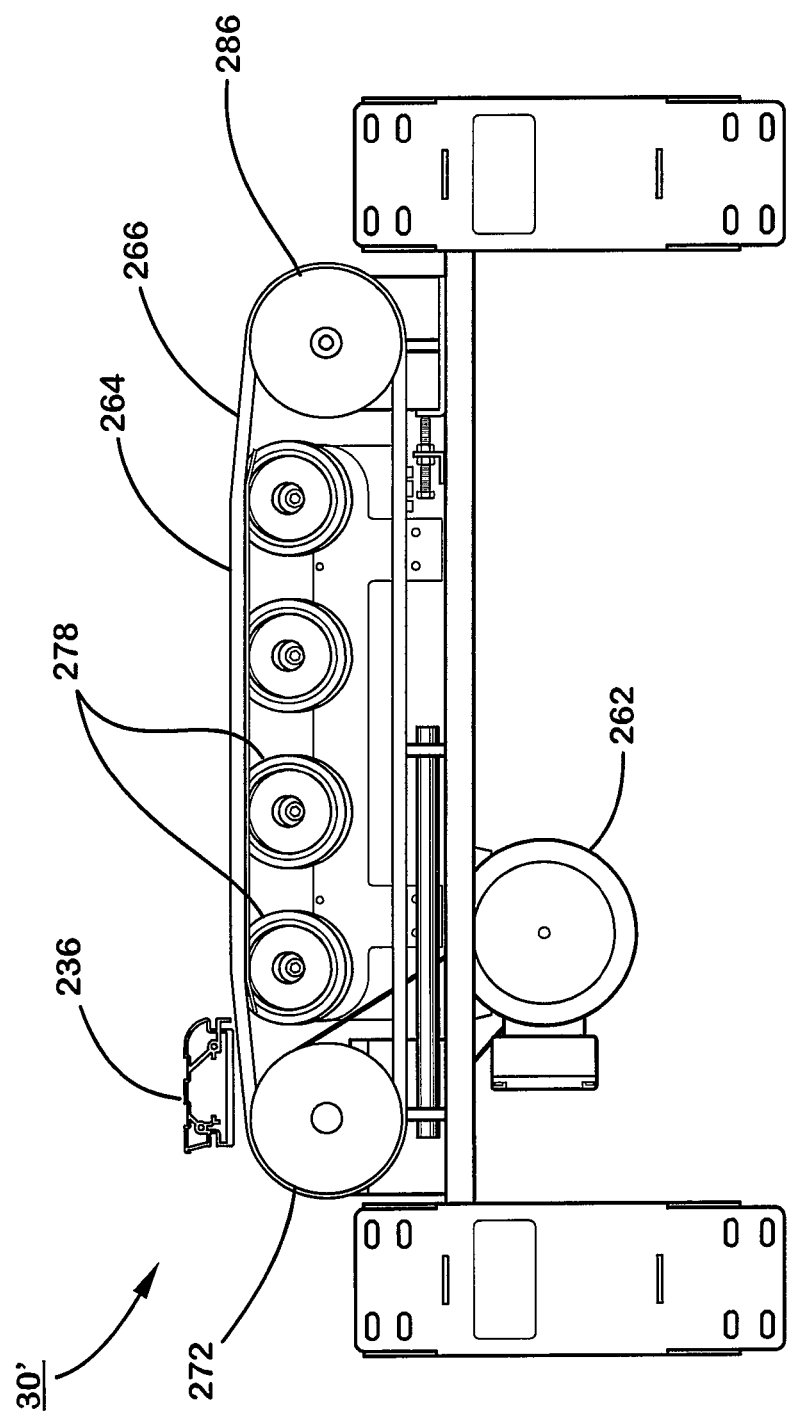
FIG. 28 is a side elevation of the drive assembly in FIG. 27.
Figure 29:
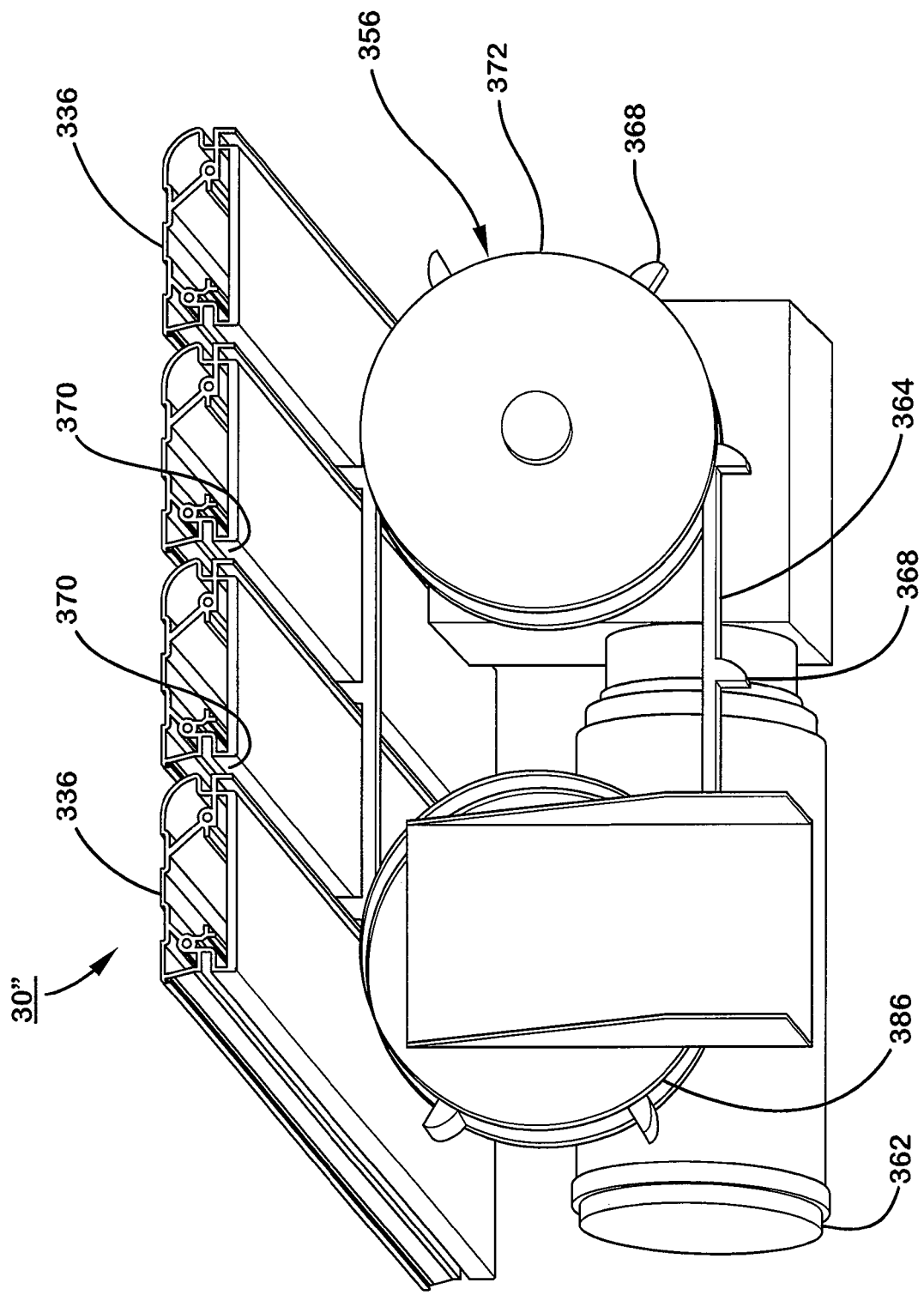
FIG. 29 is a perspective view of yet another alternative embodiment of a drive assembly.

Drive assembly 56 includes a drive pulley 72 driving belt 64. Belt 64 includes inwardly projecting pulley interfacing cogs 74, and drive pulley 72 has teeth 76 engaging cogs 74. As with slat drive cogs 68, pulley interfacing cogs 74 are each made from a urethane that is welded to belt 64, but could also be integrally formed with the rest of the belt. Drive assembly 56 includes one or more pressure pulleys 78 pressing belt 64 against surface 58/61. Pulley interfacing cogs 74 may extend only partially across a width of belt 64 thereby defining a generally planar edge portion 80 where belt 64 is engaged by the pressure pulleys 78 (FIG. 17). Pressure pulleys 78 may include a recessed area 82 and a flange 84 adjacent to recessed area 82 with recessed area 82 accommodating pulley interface cogs 74 and flanges 84 engaging generally planar edge portions 80 of belt 64. While pressure pulleys 78 could, alternatively, be cogged pulleys, it is believed that the present configuration of belt 64 and pulleys 78 reduces noise. In the illustrated embodiment, there are a plurality of pressure pulleys 78 that are divided into pressure pulleys 78a engaging one edge portion 80 of belt 64 and pressure pulleys 78b engaging an opposite edge portion 80 of belt 64. Pressure pulleys 78a may be offset from pressure pulleys 78b in the longitudinal direction of travel of web 32 to provide more distributed support to the belt as best seen in FIG. 18.

Drive assembly 56 includes one or more non-driven idler pulley 86 that guides belt 64. Idler pulleys 86 are at opposite end portions of drive assembly 56. Drive pulleys 72 and idler pulley 86 are spaced away from surface 58/61. This allows slat drive cogs 68 to become better aligned with interface 70 before engaging the interface, as would be understood by the skilled artisan. Drive assembly 56 may include a V-shaped deflector shield 88 in the direction of travel of the web toward the drive assembly. The purpose of shield 88 is to deflect any stray diverting member 39 that may approach a drive assembly 56 to avoid damage to sorter 30. Drive assembly 56 includes a support base 90 and an operational assembly 92 (including pulleys 72, 68 and 86 and belt 64) mounted to base 90 by a plurality of mounts 94. Mounts 94 accommodate limited front-to-back and/or side-to-side motion between support base 90 and operational assembly 92. Mounts 94 may include springs 96 biasing operational assembly 92 against surface 58/61.

A generally identical configuration of drive assemblies 56 may be used interchangeably whether used to propel the upper run 57 or the lower run 60 of the web. Also, the drive assembly can be positioned at various lateral locations across the width of frame 126 with minimal reconfiguring, as illustrated in FIG. 3.

In an alternative embodiment, a drive assembly 156 includes a belt 164 that is driven by a motor 162 and has an outer surface 166 that defines a high-friction engagement with lower surface 58 or upper run 57 or with upper surface 61 of lower run 60 of web 32 (FIGS. 19-26). Belt 164 is driven by a drive pulley 172 that is rotated by motor 162. Drive assembly 156 includes a support base 190 having both leading and trailing deflector shields. Belt 164 has pulley engaging cogs 174 for positive engagement with the teeth of drive pulley 172 and a generally planar edge portion 180 outside of cogs 174.

Drive assembly 156 is similar to drive assembly 56 except that belt 164 includes two sets of different configuration slat drive cogs. One configuration of the slat drive cogs 168a is larger than the other configuration of slat drive cogs 168b. Slat drive cogs 168a are configured to engage the interface 70 between adjacent slats 36 in the same manner as cogs 68 of belt 64. The other configuration of slat drive cogs 168b are configured to engage an outward opening slot or groove 37 formed in a slat 36 (see FIGS. 25 and 26). In the illustrated embodiment, groove 37 is formed toward the front edge of slat 36 and, therefore, slat drive cogs 168a, 168b tend to be close to each other. However, groove 37 could be at other locations on the slat, such as toward the center of slat, wherein slat drive cogs 168a, 168b could be more evenly spaced from each other.

The purpose of having two different configurations of slat drive cogs is to have one type of cog 168a that is more suited to propel web 32 forward under the load of the web and the articles being conveyed by the web. Thus, cog 168a applies a propel force, shown by the "Propel" vector in FIG. 22 on interface 70. The other type of cog 168b is more suited to decelerating the web when motor 162 is being driven at a decreasing speed. When such deceleration occurs, the forward momentum of web 32 tends to place a force on belt 164 that must be resisted by the belt to avoid disengagement between the belt and the slats. Thus, cog 168b applies a decelerate force, shown by the "Decelerate" vector in FIG. 22 on slot 37. Of course, slat drive cog 168b may assist slat drive cog 168a in propelling the web forward and slat drive cog 168a may assist slat drive cog 168b in decelerating the web.

However, each cog is configured for its primary function and the configuration of the portion of the slat(s) that it engages. Thus, slat drive cog 168a is taller than slat drive cog 168b and has a leading flat face in order to engage the rear surfaces of the slats. Slat drive cog 168a is shorter than slat drive cog 168a and has a trailing flat face in order to fit within and apply a decelerate force on groove 37. In the illustrative embodiment, groove 37 provides a lateral stabilizing function on the travel of pusher shoes 38 as described in commonly assigned U.S. Pat. Nos. 6,866,136 and 6,860,383, the disclosures of which are hereby incorporated herein by reference. However, groove 37 could be formed for the sole purpose of providing an interface with slat drive cog 168b. Also, multiple grooves 37 could be formed on each slat.

Web 32 includes a wheel assembly 98a, 98b at each lateral end of slats 36 to interconnect slats 36 and to provide moveable support to web 32. Web 32 may further include a separable interface 100 between each lateral end of each slat 36 and wheel assembly 98a, 98b. Separable interface provides for generally vertical separation between slats 36 and wheel assembly 98a, 98b. This allows slats to be removed from above by lifting the slats upwardly off of the wheel assembly either to replace the slat or to access an interior portion of sorter 30. This avoids the necessity to access wheel assembly 98a, 98b, which may be covered by a capture member 146. Separable interface 100 may be defined by an insert 102 that engages the lateral end of slat 36 and a generally horizontal member 106 on wheel assembly 98a, 98b. Horizontal member 106 vertically supports insert 102. Insert 102 includes an outer portion 103 that defines fastener receiving openings 109 that are aligned with fasteners, such as press-fit nuts 108, at horizontal member 106. Openings 109 accommodate fasteners 107 connecting the insert, and hence the slat, to horizontal member 106. Insert 102 further includes an inner portion 104 that is configured to extend into the interior of slat 36, such as by interference fit, and may include optional fasteners 105 to ensure engagement between insert 102 and slat 36. Insert 102 may be made from a polymeric material to promote noise dampening.

Wheel assembly 98a, 98b includes a plurality of connector plates 110, each defining a pair of wheel support openings 112, 114 at opposite ends of the connector plate (FIGS. 12-14). When assembled, one of the wheel support openings 112 on one of the connector plates is concentric with the other wheel support openings 114 on adjacent one of said connector plates. A wheel axle 117, supporting a wheel 118, extends through wheel support opening 112 in a manner that facilitates rotational motion between adjacent support plates and is fastened at the other wheel support opening 114 in order to interconnect adjacent connector plates. Horizontal member 106 is defined by a support plate 120 that is riveted or welded to connector plate 110. A horizontal wheel support plate 122 extends on an opposite side of connector plate 110 from horizontal member 106 and is riveted or welded to the connector plate. Horizontal wheel support plate 122 supports a side thrust wheel 124.

While shown as separate members, support plates 120, 122 may alternatively be defined by a common plate that passes through connector plate 110 and defines horizontal member 106 and horizontal wheel support plate 122. While horizontal member 106 and wheel support 122 could be formed from the same material sheet as connector plate 110, the use of separate plates substantially eliminates the need for right angle bends to the metal which may reduce strength. It should be understood that other forms of wheel assemblies may be used to support web 32 including various arrangements of vertical and/or horizontal wheels and/or skids in combination with other forms of elongated members, such as other configurations of connector plates as well as conventional chains, and the like. All of those are intended to be encompassed within the meaning of a wheel assembly. Examples of wheel assemblies are disclosed in commonly assigned U.S. Pat. Nos. 5,127,510; 6,866,136 and 6,860,383, the disclosures of which are hereby incorporated herein by reference.

Sorter 30 further includes a frame 126 that moveably supports web 32. Frame 126 is made up of spaced apart first lateral side assembly 128 and a second lateral side assembly 130 that are interconnected by lateral cross members 132 (FIGS. 1-5). First lateral side assembly 128 is made up of a first upper track member 134 and a first lower track member 136 that are interconnected by a first plate 138. First plate 138 provides generally rigid interconnection between first upper and first lower track members 134, 136. In a similar fashion, second lateral side assembly 130 is made up of a second upper track member 140, a second lower 142 track member and a second plate 144. Second plate 144 provides generally rigid interconnection between second upper and second lower track members 140, 142. Wheel assemblies 98*a*, 98*b* are supported at upper run 57 by first and second upper track members 134, 140 and at lower run 60 by first and second lower track members 136, 142. A catenary support 148 accommodates expansion and contraction of web 32.

Frame 126 can be easily configured to various lengths and widths. For example, in order to provide a narrower width, it is only necessary to reduce the length of cross members 132 and slats 36. In order to provide a shorter length, it is only necessary to reduce the length of track members 134, 136, 140, 142. A fewer number of plates 138 and 144 may be used. Track members 134, 136, 140 and 142 are configured so that they may all be made from substantially identical extrusions. This reduces the number of required different components. Lateral cross members 132 connect with first and second plates 138, 144. This allows the cross members to be at a desired height to support drive assemblies 56.

In an alternative embodiment, positive displacement sorter 30' includes an endless web made up of a plurality of interconnected slats 236 that are driven by a propulsion system having one or more drive assemblies 256. Drive assembly 256 includes a motor 262 that drives a drive pulley 272, which, along with an idler pulley 286, supports a belt 264. A plurality of pressure pulleys 278 press belt 264 against a lower surface of slats 236 in an upper run of the web or against an upper surface of slats 236 in a lower run of the web in order to increase the engagement force between surface 266 of belt 264 and the driven surface of slats 236. Belt 264 has a generally plain belt surface 266 that has a high coefficient of friction in combination with the material making up slats 236 in order to provide a high-friction interface with the driven surface of slats 236.

Techniques may be provided in order to provide a counteracting force on slats 236, particularly in the upper run of the web in order to ensure that the slats do not get lifted upwardly and are thereby kept in high-friction engagement with belt surface 266. Such techniques may include providing a capture plate above the wheel assemblies (not shown) supporting slats 236 in order to restrain upper motion of the vertical wheels of the wheel assemblies. Alternatively, the wheel assemblies may include wheels that are oriented at an angle that is between vertical and horizontal, such as at 45 degrees, in order to resist both side thrust and upward thrust of the slats. Other examples will be apparent to the skilled artisan.

In another alternative embodiment, a positive displacement sorter 30" includes a drive assembly 356 that includes a drive pulley 372 and an idler pulley 386 that driveably support a belt 364. Belt 364 includes a belt surface having slat drive cogs 368 that engage the interface 370 between adjacent slats 336 of the web. Drive assembly 356 does not utilize pressure pulleys, but, instead, provides relatively close spacing between drive pulley 372 and idler pulley 386. Drive pulley 372 is driven by a motor 362. Other embodiments will be apparent to the skilled artisan.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A positive displacement sorter, comprising:
   a plurality of interconnected parallel slats defining an endless web that travels in a longitudinal direction, said web having upper and lower runs and transition sections between said upper and lower runs, an upper surface of said upper run of said web defining an article-conveying surface;
   a plurality of pusher shoes, each of said shoes travelling along at least one of said slats in order to laterally displace articles on said conveying surface, each of said shoes having a diverting member extending below said conveying surface;
   a plurality of diverting rails below said conveying surface, each of said diverting rails capable of engaging said diverting member to cause the associated shoe to travel laterally to divert an article;
   a plurality of diverters, each for selectively diverting at least one of said diverting members from a non-diverting path extending longitudinally along said sorter to one of said diverting rails in a diverting state; and
   a propulsion system propelling said web, said propulsion system including at least one drive assembly engaging a driven surface comprising a lower surface of said upper run or an upper surface of said lower run, wherein said at least one drive assembly includes a belt having a belt surface engaging said driven surface, said belt surface adapted to resist slippage between said belt and said driven surface, wherein said belt surface comprises a plurality of slat drive cogs, each adapted to engage a vertical surface of one of said slats, wherein at least some of said slats have a groove formed in that slat and wherein said slat drive cogs comprise a set of first slat drive cogs each adapted to engage an interface between adjacent ones of said slats and a set of second slat drive cogs each adapted to engage said groove in one of said slats.

2. The sorter as claimed in claim 1 wherein said at least one drive assembly comprises a plurality of drive assemblies engaging said driven surface, said plurality of drive assemblies distributed about said web.

3. The sorter as claimed in claim 2 wherein each of said drive assemblies includes a variable speed motor and a control establishing a speed of said motor, wherein said variable speed motors are driven at a common speed.

4. The sorter as claimed in claim 1 wherein said at least one drive assembly includes a drive pulley driving said belt, said belt having pulley interface cogs and said drive pulley having teeth engaging said pulley interface cogs.

5. A positive displacement sorter, comprising:
   a plurality of interconnected parallel slats defining an endless web that travels in a longitudinal direction, said web having upper and lower runs and transition sections between said upper and lower runs, an upper surface of said upper run of said web defining an article-conveying surface;
a plurality of pusher shoes, each of said shoes travelling along at least one of said slats in order to laterally displace articles on said conveying surface, each of said shoes having a diverting member extending below said conveying surface;
a plurality of diverting rails below said conveying surface, each of said diverting rails capable of engaging said diverting member to cause the associated shoe to travel laterally to divert an article;
a plurality of diverters, each for selectively diverting at least one of said diverting members from a non-diverting path extending longitudinally along said sorter to one of said diverting rails in a diverting state; and
a propulsion system propelling said web, said propulsion system including at least one drive assembly engaging a driven surface comprising a lower surface of said upper run or an upper surface of said lower run, wherein said at least one drive assembly includes a belt having a belt surface engaging said driven surface, said belt surface adapted to resist slippage between said belt and said driven surface, wherein said at least one drive assembly includes a drive pulley driving said belt, said belt having pulley interface cogs and said drive pulley having teeth engaging said pulley interface cogs, wherein said at least one drive assembly includes at least one pressure pulley pressing said belt against said driven surface and wherein said pulley interface cogs extend only partially across a width of said belt thereby defining a generally planar edge portion wherein said at least one pressure pulley includes a recessed area and at least one flange adjacent said recessed area, said recessed area accommodating said pulley interface cogs and said at least one flange engaging said edge portion of said belt.

6. The sorter as claimed in claim 5 wherein said at least one pressure pulley includes a plurality of pressure pulleys, some of said pressure pulleys engaging one edge portion of said belt and the other of said pressure pulleys engaging an opposite edge portion of said belt and wherein some of said pressure pulleys are offset from said other of said pressure pulleys in said longitudinal direction.

7. The sorter as claimed in claim 5 wherein said at least one drive assembly includes a pair of spaced apart non-driven idler pulleys, said idler pulleys being spaced away from said lower surface of said upper run or said upper surface of said lower run.

8. The sorter as claimed in claim 5 wherein said at least one drive assembly includes a deflector shield, said shield deflecting any said diverting member approaching said at least one drive assembly.

9. The sorter as claimed in claim 5 wherein said at least one drive assembly includes a support base and an operational assembly mounted to said base by a plurality of mounts, said operational assembly comprising said driven belt, a motor driving said driven belt and pulleys supporting said driven belt, said plurality of mounts accommodating limited motion between said support base and said operational assembly.

10. The sorter as claimed in claim 9 wherein said mounts include springs biasing said operational assembly against said lower surface of said upper run or said upper surface of said lower run.

11. A drive assembly for a positive displacement sorter having a plurality of interconnected parallel slats defining an endless web that travels in a longitudinal direction, said web having upper and lower runs and transition sections between said upper and lower runs, an upper surface of said upper run of said web defining an article-conveying surface, said drive assembly comprising:
a belt having a belt surface that is adapted to engage a driven surface comprising a lower surface of the upper run or an upper surface of the lower run and a drive pulley driving said belt, wherein said belt surface comprises a plurality of slat drive cogs, each adapted to engage a vertical surface of one of said slats, a pair of end pulleys and a plurality of inner pulleys between said end pulleys, said inner pulleys biasing said belt surface against the slats, at least one of said end pulleys being spaced away from said lower surface of said upper run or said upper surface of said lower run to provide a transition between said drive cogs and said slats.

12. The drive assembly as claimed in claim 11 wherein at least some of said slat drive cogs are each adapted to engage an interface between adjacent ones of said slats.

13. The drive assembly as claimed in claim 11 wherein at least some of said slats have a groove formed in that slat and wherein at least some of said slat drive cogs are each adapted to engage said groove in one of said slats.

14. The drive assembly as claimed in claim 11 wherein said belt having pulley interface cogs on a surface opposite said slat drive cogs, said pulley interface cogs engaging teeth in said drive pulley.

15. A drive assembly for a positive displacement sorter having a plurality of interconnected parallel slats defining an endless web that travels in a longitudinal direction, said web having upper and lower runs and transition sections between said upper and lower runs, an upper surface of said upper run of said web defining an article-conveying surface, said drive assembly comprising:
a belt having a belt surface that is adapted to engage a driven surface comprising a lower surface of the upper run or an upper surface of the lower run and a drive pulley driving said belt, wherein said belt surface comprises a plurality of slat drive cogs, each adapted to engage a vertical surface of one of said slats, wherein at least some of said slats have a groove formed in that slat and wherein said slat drive cogs comprise a set of first slat drive cogs each adapted to engage an interface between adjacent ones of said slats and a set of second slat drive cogs each adapted to engage said groove in one of said slats.

16. A drive assembly for a positive displacement sorter having a plurality of interconnected parallel slats defining an endless web that travels in a longitudinal direction, said web having upper and lower runs and transition sections between said upper and lower runs, an upper surface of said upper run of said web defining an article-conveying surface, said drive assembly comprising:
a belt having a belt surface that is adapted to engage a driven surface comprising a lower surface of the upper run or an upper surface of the lower run and a drive pulley driving said belt, wherein said belt surface comprises a plurality of slat drive cogs, each adapted to engage a vertical surface of one of said slats, wherein said belt having pulley interface cogs on a surface opposite said slat drive cogs, said pulley interface cogs engaging teeth in said drive pulley, wherein said at least one drive assembly includes at least one pressure pulley pressing said belt against said driven surface and wherein said pulley interface cogs extend only partially across a width of said belt thereby defining a generally planar edge portion of said belt wherein said at least one pressure pulley includes a recessed area and at least one flange adjacent said recessed area, said recessed area accommodating said pulley interface cogs and said at least one flange engaging said edge portion of said belt.

17. The drive assembly as claimed in claim 16 wherein said at least one pressure pulley includes a plurality of pressure pulleys, some of said pressure pulleys engaging one edge portion of said belt and the other of said pressure pulleys engaging an opposite edge portion of said belt and wherein some of said pressure pulleys are offset from said other of said pressure pulleys in said longitudinal direction.

18. A drive belt for a drive assembly for a positive displacement sorter, said sorter having a plurality of interconnected parallel slats defining an endless web that travels in a longitudinal direction, said web having upper and lower runs and transition sections between said upper and lower runs, an upper surface of said upper run of said web defining an article-conveying surface, said drive assembly having a drive pulley that is adapted to drive said belt, said belt comprising:
 a belt surface engaging a driven surface comprising a lower surface of the upper run or an upper surface of the lower run of the web, said belt surface having a plurality of slat drive cogs, each adapted to engage a vertical surface of one of said slats, wherein said slat drive cogs comprise a set of first slat drive cogs each adapted to engage an interface between adjacent ones of the slats and a set of second slat drive cogs each adapted to engage a groove in one of the slats.

19. The belt as claimed in claim 18 wherein said first slat drive cogs have different shapes than said second slat drive cogs.

20. The belt as claimed in claim 18 including pulley interface cogs on a surface opposite from said belt surface, said pulley interface cogs adapted to engage teeth in the drive pulley.

21. A positive displacement sorter, comprising:
 a plurality of interconnected parallel slats defining an endless web that travels in a longitudinal direction, said web having upper and lower runs and transition sections between said upper and lower runs, an upper surface of said upper run of said web defining an article-conveying surface;
 a plurality of pusher shoes, each of said shoes travelling along at least one of said slats in order to laterally displace articles on said conveying surface, each of said shoes having a diverting member extending below said conveying surface;
 a plurality of diverting rails below said conveying surface, each of said diverting rails capable of engaging said diverting member to cause the associated shoe to travel laterally to divert an article;
 a plurality of diverters, each for selectively diverting at least one of said diverting members from a non-diverting path extending longitudinally along said sorter to one of said diverting rails in a diverting state; and
 a propulsion system propelling said web;
 wherein said web includes a wheel assembly at each lateral end of said slats to interconnect said slats and to provide moveable support to said web and a separable interface between each lateral end of each of said slats and said wheel assembly, said separable interface allowing said slats to be generally vertically separable from said wheel assembly, said separable interface includes an insert engaging the lateral end of the slat and having upper and lower surface portions that generally coincide with upper and lower surfaces of said slats, said separable interface including a generally horizontal member defined by a metal plate that is joined with a metallic portion of said wheel assembly, wherein with said lower surface portion of said insert supported by said horizontal member at least two fasteners extending between said upper surface portion of said insert and said metal plate removeably supports said slat with said wheel assembly.

22. The sorter as claimed in claim 21 wherein said insert comprises a first portion that engages an interior of the corresponding one of said slats and an outer portion extending laterally beyond the corresponding one of said slats.

23. The sorter as claimed in claim 21 wherein said insert defines at least two fastener receiving openings that are aligned with fasteners at said generally horizontal member and said at least two fasteners extend through said openings.

24. The sorter as claimed in claim 21 wherein said wheel assembly includes a plurality of connector plates, each supporting one generally horizontal member and wheel support openings at opposite ends of said connector plate.

25. The sorter as claimed in claim 24 wherein one of said wheel support openings on one of said connector plates is concentric with another of said wheel support openings on an adjacent one of said connector plate.

26. The sorter as claimed in claim 25 including a wheel axle extending through said one of said wheel support openings and fastened at said another of said wheel support opening in order to interconnect adjacent ones of said connector plates.

* * * * *